(12) United States Patent
Choi et al.

(10) Patent No.: US 12,541,897 B2
(45) Date of Patent: Feb. 3, 2026

(54) ELECTRONIC DEVICE PROVIDING IMAGE CORRECTION FUNCTION AND IMAGE PROCESSING METHOD THEREOF

(71) Applicant: Samsung Electronics Co., Ltd., Suwon-si (KR)

(72) Inventors: Yoonjung Choi, Suwon-si (KR); Jiyoung Kang, Suwon-si (KR); Kyunghwa Seo, Suwon-si (KR); Yejin Kim, Suwon-si (KR); Joonil Park, Suwon-si (KR); Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 18/334,896

(22) Filed: Jun. 14, 2023

(65) Prior Publication Data
US 2023/0325980 A1  Oct. 12, 2023

Related U.S. Application Data

(63) Continuation of application No. PCT/KR2022/000303, filed on Jan. 7, 2022.

(30) Foreign Application Priority Data

Jan. 12, 2021  (KR) .................. 10-2021-0004190

(51) Int. Cl.
*G06T 11/60* (2006.01)
*G06T 7/00* (2017.01)

(52) U.S. Cl.
CPC ............ *G06T 11/60* (2013.01); *G06T 7/0002* (2013.01); *G06T 2200/24* (2013.01); *G06T 2207/20081* (2013.01); *G06T 2207/30168* (2013.01)

(58) Field of Classification Search
CPC ......... G06T 5/00; G06T 7/0002; G06T 11/60; G06T 2200/24; G06T 2207/20081;
(Continued)

(56) References Cited

U.S. PATENT DOCUMENTS

| 11,159,793 B2 | 10/2021 | Ahn et al. |
| 2004/0071462 A1 | 4/2004 | Gindele et al. |

(Continued)

FOREIGN PATENT DOCUMENTS

| EP | 3859659 A1 | 8/2021 |
| JP | 2004135349 A | 4/2004 |

(Continued)

OTHER PUBLICATIONS

International Search Report for PCT/KR2022/000303 mailed May 2, 2022, 5 pages.

(Continued)

*Primary Examiner* — Jin Cheng Wang
(74) *Attorney, Agent, or Firm* — Nixon & Vanderhye, P.C.

(57) ABSTRACT

An example image processing method may include determining a first image to be corrected; obtaining a second image by correcting the first image; and identifying at least one part, from among a plurality of parts in the second image, for recommending an effect caused by correction. The method may include displaying an indicator indicating at least one part in the second image and correction may be performed by automatically recommending and applying one or more correction functions for image enhancement to each image. The method may provide an original comparison display function or an enlarged display function for an enhanced image.

20 Claims, 19 Drawing Sheets

(58) Field of Classification Search
CPC ............. G06T 2207/30168; G06T 5/50; G06F 3/0484; G06F 3/14; G06F 3/04845; G06F 2203/04803; H04N 23/62; H04N 23/951; H04N 23/631; H04N 23/64
See application file for complete search history.

(56) References Cited

U.S. PATENT DOCUMENTS

| | | |
|---|---|---|
| 2006/0280375 A1 | 12/2006 | Dalton et al. |
| 2014/0192228 A1 | 7/2014 | Lee |
| 2014/0313389 A1* | 10/2014 | Kim .................. H04N 23/62 348/333.12 |
| 2017/0034428 A1* | 2/2017 | Kwon ................ H04N 23/635 |
| 2018/0336666 A1 | 11/2018 | Kim et al. |
| 2018/0350037 A1 | 12/2018 | Matsushima |
| 2019/0116323 A1* | 4/2019 | Kim .................... H04N 5/2621 |
| 2019/0238759 A1 | 8/2019 | Ahn et al. |
| 2019/0295300 A1* | 9/2019 | Kim .................... H04N 5/2621 |
| 2020/0065855 A1 | 2/2020 | Helle et al. |
| 2020/0092465 A1 | 3/2020 | Lee et al. |
| 2020/0098091 A1* | 3/2020 | Peterson ................ G06T 7/13 |
| 2020/0250795 A1 | 8/2020 | Han et al. |
| 2020/0275031 A1 | 8/2020 | Park |
| 2021/0112179 A1* | 4/2021 | Omori .................. H04N 1/393 |
| 2021/0117073 A1 | 4/2021 | Jung et al. |
| 2021/0158570 A1* | 5/2021 | Mohandoss ........... G06V 20/48 |
| 2021/0232863 A1 | 7/2021 | Seo et al. |
| 2022/0019345 A1* | 1/2022 | Li ....................... G06F 1/1647 |
| 2022/0122236 A1 | 4/2022 | Yu |
| 2023/0419562 A1* | 12/2023 | Xiao .................. G06F 3/04883 |
| 2024/0104810 A1* | 3/2024 | Yang .................... G06V 10/25 |

FOREIGN PATENT DOCUMENTS

| | | |
|---|---|---|
| JP | 4769326 B2 | 6/2011 |
| JP | 2012142780 A | 7/2012 |
| JP | 6909818 B2 | 7/2021 |
| JP | 2022539683 A | 9/2022 |
| KR | 100584454 B1 | 5/2006 |
| KR | 20110014451 A | 2/2011 |
| KR | 101075720 B1 | 10/2011 |
| KR | 20160057845 A | 5/2016 |
| KR | 20180051367 A | 5/2018 |
| KR | 20180133207 A | 12/2018 |
| KR | 101972004 B1 | 8/2019 |
| KR | 102079091 B1 | 2/2020 |
| KR | 20200095106 A | 8/2020 |
| KR | 102201858 B1 | 1/2021 |
| KR | 102287043 B1 | 8/2021 |
| KR | 20210095527 A | 8/2021 |
| KR | 20220029930 A | 3/2022 |
| KR | 102465248 B1 | 11/2022 |

OTHER PUBLICATIONS

Written Opinion of the ISA for PCT/KR2022/000303 mailed May 2, 2022, 4 pages.
Office Action dated May 26, 2025 in Korean Application No. 10-2021-0004190 and English-language translation.

* cited by examiner

ELECTRONIC DEVICE PROVIDING IMAGE CORRECTION FUNCTION AND IMAGE PROCESSING METHOD THEREOF

CROSS-REFERENCE TO RELATED APPLICATIONS

This application is a continuation of International Application No. PCT/KR2022/000303, designating the United States, filed Jan. 7, 2022 which claims priority to Korean Patent Application No. 10-2021-0004190, filed Jan. 12, 2021, in the Korean Intellectual Property Office. The contents of each of this application are incorporated herein in their entireties.

BACKGROUND

Field

The disclosure relates to an electronic device and an image processing method thereof.

Description of Related Art

An electronic device (e.g., a smart phone, a mobile terminal, a digital camera, or a wearable device) may provide various functions (e.g., a photographing function, a filter function, a photo editing function, an album function, a transmission/reception function, a video call function, or a messenger function) using a camera or an image.

Various attempts have been made to improve camera performance or image (e.g., photo) quality in an electronic device.

SUMMARY

An electronic device may provide a function of increasing image quality or restoring a photo of a low-resolution image to a high-resolution photo. For example, this function may be provided through an application running on an electronic device. In order to improve the image quality of a photo, there may be an application capable of accumulating and learning face data of a person and redrawing only the face in the photo. In such an application, some textures (e.g., an expression or an eye size) of the person's face may be changed unnaturally, or details in parts other than the face may be severely blurred.

Various example embodiments may provide an electronic device and an image processing method thereof, wherein detail enhancement and noise reduction are capable of being stably implemented with respect to the entire image, not just a specific part (e.g., the face).

Various example embodiments may provide an electronic device and an image processing method thereof, wherein a correction function necessary or desirable for each image (e.g., a photo) may be automatically recommended through an artificial intelligence-based image processing technique, so that a user can easily and accurately recognize a correction result according to the recommendation to acquire an improved image of a desired level.

According to various example embodiments, an electronic device may include a memory, a display, and at least one processor connected to the memory and the display. The memory may store instructions which, when executed, cause the at least one processor to determine a first image to be corrected, acquire a second image by correcting the first image, identify, from among multiple parts in the second image, at least one point part for recommending an effect due to the correction, and display, through the display, the second image in which an indicator indicating the at least one point part is included.

According to various example embodiments, an image processing method of an electronic device may include determining a first image to be corrected, acquiring a second image through a correction the first image, identifying, from among multiple parts in the second image, at least one point part for recommending an effect due to the correction, and displaying a screen in which an indicator indicating the at least one point part is included in the second image.

According to various example embodiments, stable detail enhancement and noise reduction may be implemented with respect to the entire image, not just a specific part (e.g., the face).

According to various example embodiments, a correction function necessary or desirable for each image (e.g., a photo) may be automatically recommended through an artificial intelligence-based image processing technique, so that a user can easily and accurately recognize a correction result according to the recommendation to acquire an improved image of a desired level.

In addition, various effects directly or indirectly identified through the disclosure may be provided.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Hereinafter, various embodiments will be described with reference to the accompanying drawings.

Figure 1:
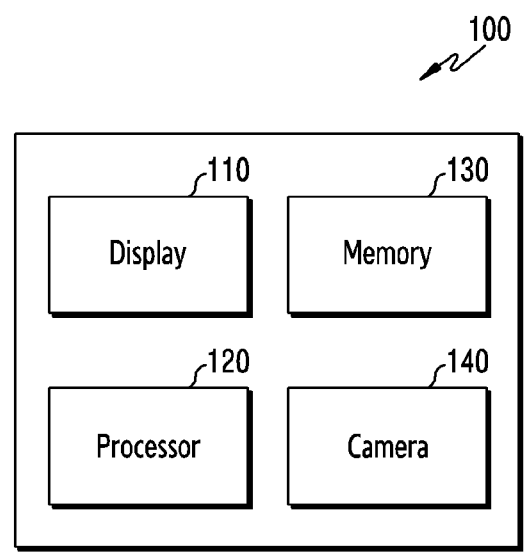
FIG. 1 is a block diagram of an example electronic device according to various embodiments.

FIG. 1 is a block diagram of an example electronic device according to various embodiments.

Referring to FIG. 1, an electronic device 100 according to an embodiment may include a display 110, a processor 120, and a memory 130. The electronic device 100 according to an embodiment may further include a camera 140.

The display 110, the processor 120, the memory 130, and the camera 140 included in the electronic device 100 may be electrically and/or operatively connected to each other to exchange signals (e.g., commands or data) with each other.

Figure 17:
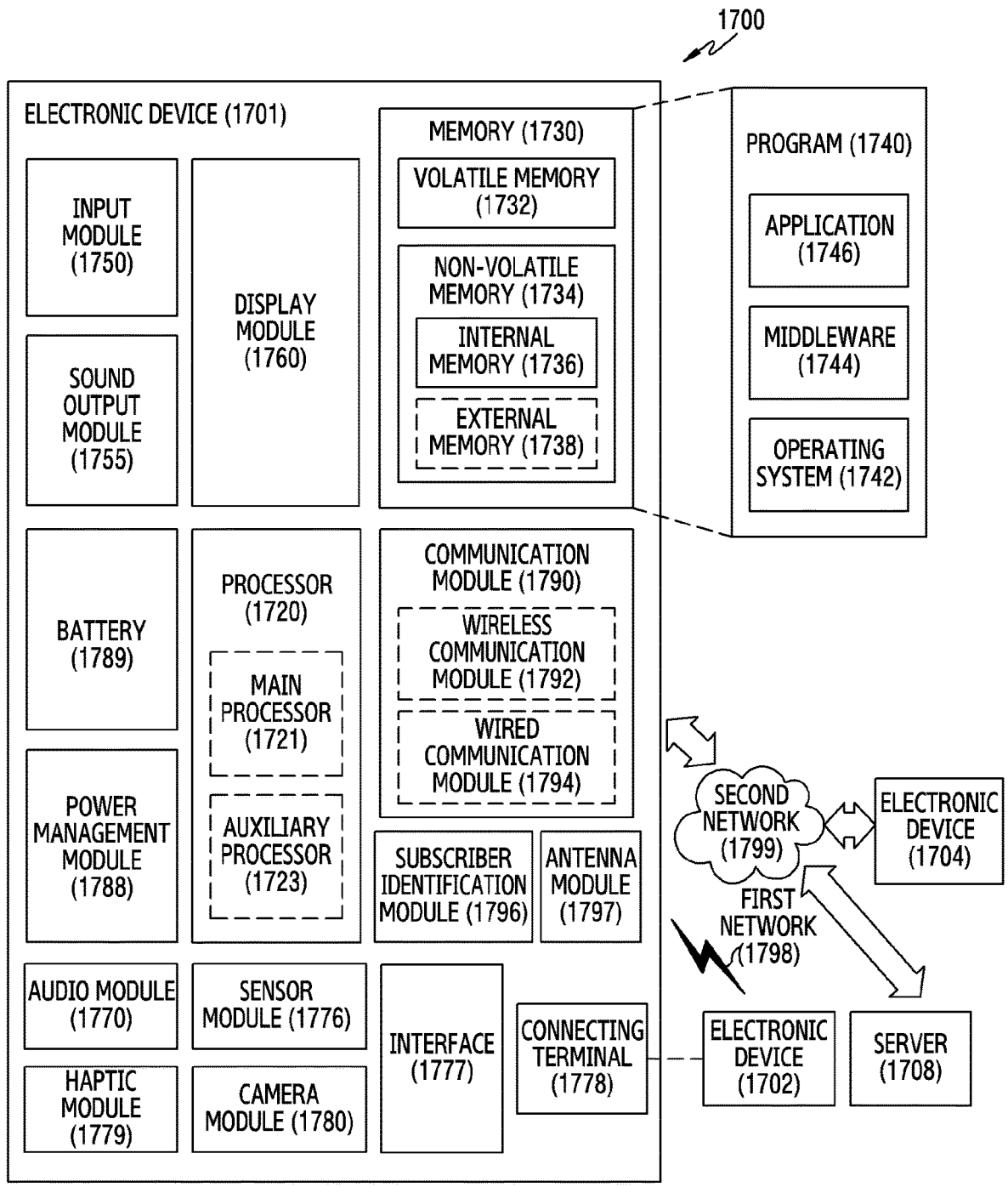
FIG. 17 is a block diagram of an example electronic device in a network environment according to various embodiments.

The electronic device 100 may include at least a part of an electronic device 1701 illustrated in FIG. 17. For example, the display 110 may be a display module 1760 in FIG. 17. The processor 120 may be a processor in FIG. 17 (one of 1720, 1721, or 1723).

The processor 120 (including, e.g., processing circuitry) may include at least one processor. For example, the processor 120 may include at least one among an application processor (AP) (e.g., a main processor 1721), an image signal processor (ISP) (e.g., an image signal processor 1660—see FIG. 16), and a communication processor (CP) (e.g., an auxiliary processor 1723).

Figure 16:
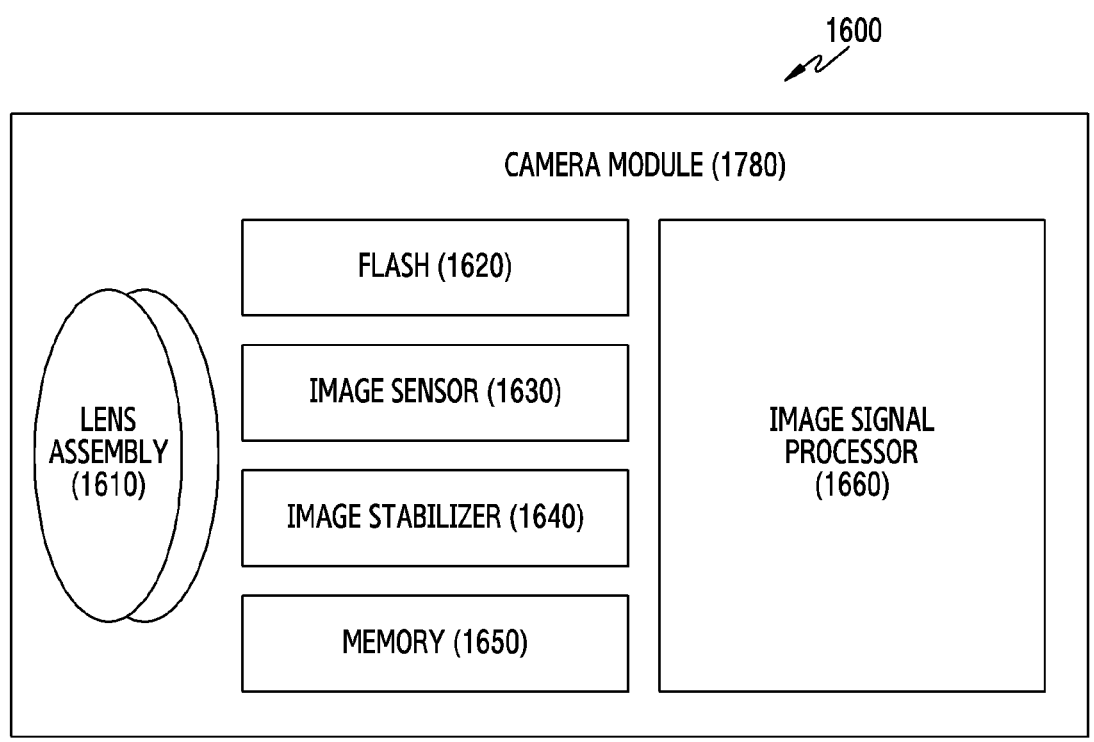
FIG. 16 is a block diagram illustrating an example camera module according to various embodiments.

The camera 140 may correspond to a camera module 1780 in FIG. 16 or may include at least a part of the camera module 1780.

The camera 140 may acquire an image (a still image, e.g., a photo) or a video through a photographing (or capturing) operation. The capture result (e.g., the images and/or the video) may be stored in the memory 130.

The processor 120 may control the camera 140. The processor 120 may support various functions using the camera 140. The processor 120 may store an image acquired through the camera 140 in the memory 130 and display the stored image through the display 110. For example, an execution screen of an application executed by the processor 120 or an image stored in the memory 130 may be displayed on the display 110.

The processor 120 may execute and/or control various functions supported by the electronic device 100.

The processor 120 may control the camera 140 to acquire an image. For example, the camera 140 may acquire an image at a specified aspect ratio (e.g., 4:3).

The processor 120 may control the display 110. The processor 120 may display the image acquired through the camera 140 on the display 110.

The processor 120 may execute a code, written in a programming language and stored in the memory 130 of the electronic device 100, to execute an application and control various types of hardware. For example, the processor 120 may execute an application (e.g., an album application, a camera application, or an editing application) to display multiple images stored in the memory 130 and/or a user interface (UI) related to the multiple images on an application execution screen. An operation of the processor 120 may be performed by executing instructions stored in the memory 130.

In an embodiment, the display 110 may display, on the display 110, an execution screen of an application executed by the processor 120 or content such as an image or a video stored in the memory 130. In addition, the processor 120 may display an image or a video acquired through the camera 140 on the display 110 in real time.

The processor 120 may provide, for example, a view function, a preview function, an arrangement and/or management function for images stored in the memory 130. In addition, the processor 120 may provide image processing (e.g., correction, revitalization, or editing) functions. For example, on the application execution screen, various functions for displaying images captured or downloaded by the camera 140 to the user or supporting image processing may be provided.

The processor 120 may perform an image processing operation. The processor 120 may determine a first image that is to be corrected. The first image may be an original image. The processor 120 may acquire a second image by correcting the first image. The second image may be a corrected image or an improved image. The processor 120 may identify, from among multiple parts in the second image, at least one point part for recommending an effect due to the correction. The processor 120 may include an indicator indicating the at least one point part in the second image and display the indicator on the display 110.

Figure 2A:
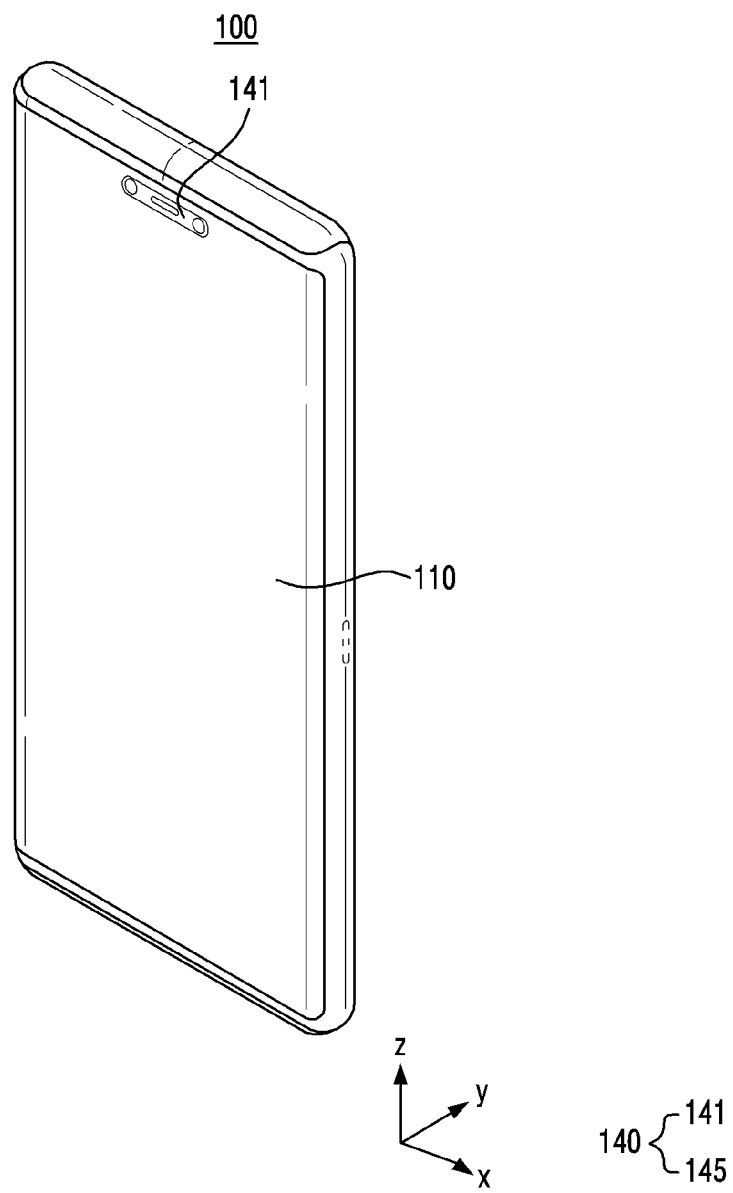
FIG. 2A is a front perspective view of an example electronic device according to various embodiments.
Figure 2B:
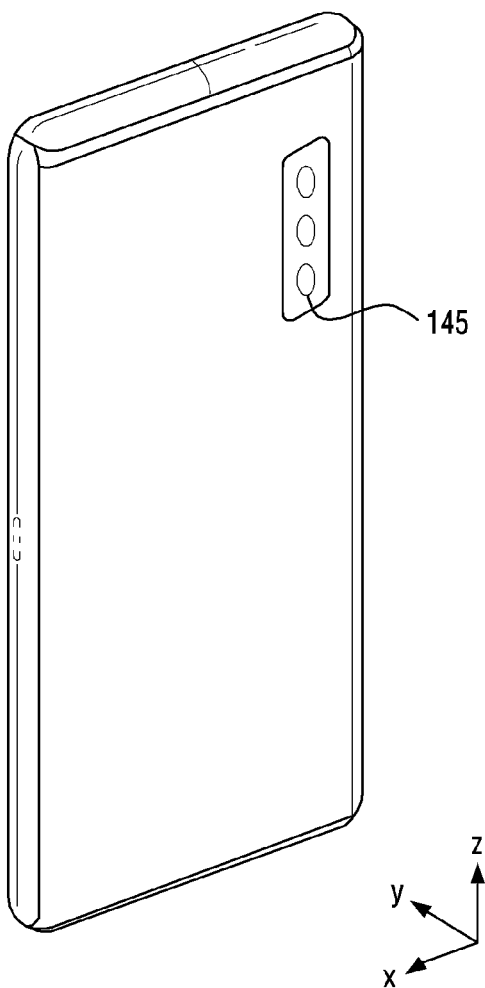
FIG. 2B is a rear perspective view of an example electronic device according to various embodiments.

FIGS. 2A and 2B illustrate a mechanical structure of an example electronic device according to various embodiments.

Referring to FIGS. 2A and 2B together, an electronic device 100 according to an embodiment may include a display 110 and a camera 140. The display 110 may be disposed on the front surface of the electronic device 100. The display 110 may occupy most of the area of the front surface of the electronic device 100.

The camera 140 may include a front camera 141 or a rear camera 145. One or more front cameras 141 may be disposed on the front surface of the electronic device 100. One or more rear cameras 145 may be disposed on the rear surface of the electronic device 100.

For example, each camera 140 may correspond to a camera module 1780 in FIG. 16 or may include at least a part (e.g., a lens assembly 1610 or a flash 1620) of the camera module 1780. Parts of the camera 140 may be implemented in an integrated form. For example, each camera 140 may include only some elements (e.g., the lens assembly 1610), and other elements (e.g., an image sensor 1630 or an image signal processor 1660) may be integrated into one.

The configuration of the illustrated cameras 141 and 145 is only an example, and the scope of the embodiments is not limited thereto. In an example, in the embodiments in FIGS. 2A and 2B, two front cameras 141 and three rear cameras 145 are illustrated, but various modifications, applications, or extensions are possible with respect to camera configuration (e.g., position, number, mechanical configuration).

For example, the number of rear cameras 145 may be changed, or multiple (e.g., two) front cameras 141 may be configured. Alternatively, only either the front camera 141 or the rear camera 145 may be configured. Alternatively, an external camera (not shown, e.g., a cloud camera) other than the camera 140 included in the electronic device 100 may be used alone or together with the camera 140 of the electronic device 100.

In an embodiment, the electronic device 100 may include one or more front cameras 141. The electronic device 100 may include a first front camera and a second front camera. For example, the first front camera and the second front camera may be cameras of the same type having the same specifications (e.g., pixels). In an embodiment, the first front camera and the second front camera may be implemented as cameras having different specifications. The electronic device 100 may support functions (e.g., three-dimensional photographing or auto focus) related to dual cameras through two front cameras.

One or more rear cameras 145 may be disposed on the rear surface of the electronic device 100. The electronic device 100 may include multiple rear cameras 145.

For example, the electronic device 100 may include a first rear camera, a second rear camera, and a third rear camera. In an example, the first rear camera, the second rear camera, and the third rear camera may have different specifications. The rear cameras may differ from each other in one or more of the field of view (FOV), pixel, aperture, or type or arrangement of lens set included in each camera. The first rear camera may be a normal camera, the second rear camera may be a camera (a wide-angle camera) for wide photographing, and the third rear camera may be a telephoto camera. In an embodiment, the first rear camera, the second rear camera, and the third rear camera may be cameras of the same type which have the same specifications (e.g., pixels).

The mechanical structure of the electronic device 100 illustrated in FIGS. 2A and 2B is only an example, and the scope of the embodiments is not limited to a specific structure or type of the electronic device, and various modifications, applications, or extensions are possible. For example, an electronic device according to an embodiment may be any one of a flexible type (e.g., foldable type, slidable type, or rollable type) electronic device (e.g., a smartphone), a digital camera, a wearable device, a tablet, a laptop computer, or the like.

Figure 3:
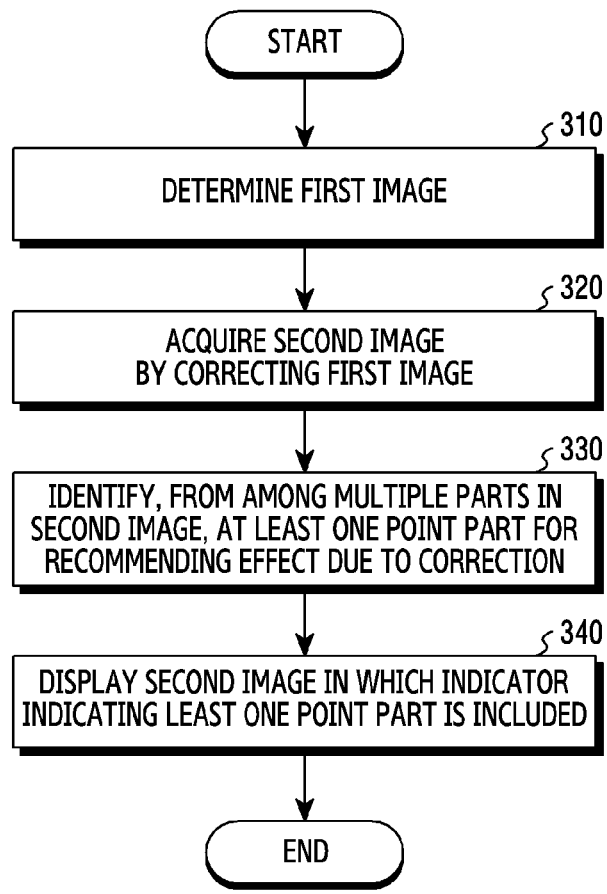
FIG. 3 is a flowchart illustrating an example image processing method of an electronic device according to various embodiments.

Embodiments illustrated in FIG. 3 and subsequent drawings may be applied not only to image processing, but also to processing of a video (e.g., or a preview image or a thumbnail image of a video).

The image processing method according to various embodiments may be performed by an electronic device (e.g., the electronic device 100 or the processor 120). For convenience of description, it is assumed that an operating entity performing each operation is the electronic device 100 or the processor 120 in FIG. 1, but the operation entity is not limited thereto. For example, an image signal processor 1660 in FIG. 16 may be an operating entity, or two or more operating entities (e.g., the processor 120 and the image signal processor 1660) may operate in conjunction with each other.

Operations according to the following embodiments may be sequentially performed, but are not necessarily performed sequentially. For example, the order of operations may be changed, or at least two operations may be performed in parallel. At least one of the operations may be omitted, the order of some operations may be changed, or another operation may be added.

FIG. 3 is a flowchart illustrating an example image processing method of an electronic device according to various embodiments.

Referring to FIG. 3, the image processing method of an electronic device according to an embodiment may include operations 310, 320, 330, and 340. For convenience of description, it is assumed that the image processing method in FIG. 3 is performed by the processor 120 of the electronic device 100.

In operation 310, the processor 120 may determine a first image to be corrected. The first image may be an original image.

For example, the first image may be an image captured or downloaded by the camera 140. The first image may be captured or downloaded and stored in the memory 130. For example, the first image may be an image captured using an application (e.g., a camera application) or shared while an application (e.g., a messenger application) is running.

For example, when the first image satisfies a designated condition (e.g., capacity of 1 M or less, size of 1000×1000 or less, or a resolution of 5 to 16 Mpx or less), the first image may be determined as an image to be corrected (or a target image).

In operation 320, the processor 120 may acquire a second image by correcting the first image. The second image may be an improved image (or a corrected image or a revitalized image).

For example, the correction may include an operation of changing or improving the attributes (or the format or standard, e.g., resolution, size, brightness, sharpness, exposure) of an image.

For example, a correction function set may be automatically recommended for the first image. The processor 120 may obtain the second image by correcting the first image by applying the recommended correction function set to the first image. The correction function set may include one or more correction functions (e.g., scaling (e.g., upscale), brightness adjustment, sharpness adjustment, and exposure adjustment).

In the following example embodiments, as examples of correction functions that can be provided through the electronic device 100, four correction functions of scaling, brightness adjustment, sharpness adjustment, and exposure adjustment are mainly mentioned. The types of correction functions and/or correction methods (e.g., upscaling methods) are merely examples, and the scope of the embodiments disclosed herein is not limited to any specific correction function or correction method.

For example, when upscale and sharpness adjustment (e.g., increase) are recommended as correction functions for the first image, the upscale and the sharpness adjustment (e.g., increase) may be applied as correction functions during correction of the first image. Correction to increase the resolution (or size or capacity) and sharpness of the first image may be performed. Through the correction, the second image with improved image quality may be acquired from the first image.

In operation 330, the processor 120 may identify, from among multiple parts in the second image, at least one point part for recommending an effect due to the correction.

The point part may be understood as a part(s) with good improvement or a part(s) with a high correction effect among the multiple parts in the second image. For example, the point part in the second image may be a part where the difference from the corresponding part in the first image is at least a certain level. For example, the processor 120 may compare and score differences between a first part (e.g., the mouth) in the first image and a second part (e.g., the mouth) in the second image corresponding to the first part, based on a predetermined evaluation criteria (e.g., a pixel value, a quality measurement value (resolution, noise, gradation expression), brightness, sharpness, exposure, or a combination thereof), and may identify the second part as a point part when the scoring result is equal to or greater than a designated threshold value.

In operation 340, the processor 120 may display a screen, in which an indicator indicating the at least one point part is included in the second image, through the display 110.

In an embodiment, the screen (e.g., a screen 510 in FIG. 5, or a first screen 610 or a second screen 650 in FIG. 6) may include a first view area displaying a first part of the first image, a second view area displaying a second part of the second image, an indicator in the second view area, and a handler dividing the first view area and the second view area. The first part of the first image and the second part of the second image may be displayed on the screen so as to be combined to form one image.

The handler may be displayed at a position outside the at least one point part.

When there are multiple point parts in the second image, the position of the handler may be adjusted based on the positions of the multiple point parts.

Depending on a user input for moving the handler, the size of the first view area and the size of the second view area may be varied in conjunction with each other.

In response to a user input requesting a correction effect comparison, a second screen (e.g., a second screen 950 in FIG. 9), which compares and shows one or more third images to which the one or more correction functions applied to the correction are applied separately, may be displayed through the display 110.

The image processing method according to an embodiment may include an operation of displaying a third screen (e.g., a second screen 1020 in FIG. 10) in response to a user input requesting repeated application of a pre-applied correction function. The third screen may include a first view area displaying a first part of the first image, a second view area displaying a second part of the second image to which the correction function has been applied, a third view area displaying a third part of a third image to which the correction function has been repeatedly applied, a first handler dividing the first view area and the second view area, and a second handler dividing the second view area and the third view area. On the third screen, the first part of the first image, the second part of the second image, and the third part of the third image may be displayed so as to be combined to form one image.

As the handler moves, the indicator may disappear or the display state of the indicator may change.

When the handler moves to pass through the indicator, the display of the indicator is maintained, and a part appearing to correspond to the indicator may be changed from a part in the second image to a part in the first image according to the movement of the handler.

A fourth screen (e.g., a second screen 720 in FIG. 7) may be displayed in response to a user input for selecting one point part of the at least one point part. On the fourth screen, a part of the second image corresponding to the selected point part is enlarged and displayed, and a map guiding the position of the selected point part in the entire area of the second image may be displayed.

In response to a user input for selecting one point part from among the at least one point part, a fifth screen (e.g., a third screen 730 or a fourth screen 750 in FIG. 7) may be displayed. The fifth screen may display a first view area in which an indicator indicating the selected point part and a cropped part of the second image corresponding to the selected point part are displayed, a second view area in which a first part of the first image corresponding to the selected point part is displayed, a third view area in which a second part in the second image, corresponding to the selected point part, is displayed so as to be compared with the first part in the first image, and a handler disposed between the second view area and the third view area.

When a zoom input is received in one of the second view area and the third view area, the first part and the second part may be synchronously scaled and displayed in both the second view area and the third view area.

The processor 120 may perform the correction by applying a recommended correction function set to the first image. The processor 120 may compare corresponding parts to find a difference between the first image and the second image. The processor 120 may identify the at least one point part, based on the comparison result.

An interaction area including multiple correction function buttons may be displayed. Each correction function applied to the second image may be turned on or off according to a user input in the interaction area to update the displayed second image.

In an embodiment, the processor 120 may analyze the first image using a learning model trained using an artificial intelligence algorithm. When a correction function set to be recommended for the first image is determined as a result of the analysis, the processor 120 may perform the correction of the first image by applying the correction function set.

For example, the processor 120 may detect multiple parts (e.g., a person, a face, an eye, a nose, a mouth, a hand, an object, a subject, a unit object, or a unit area) in an image. The processor 120 may compare corresponding parts to find a difference between the first image and the second image, and may identify at least one point part based on the comparison result. For example, the processor 120 may compare a pixel value (e.g., average value or sum) of an eye part in the second image with a pixel value of an eye part in the first image to calculate a difference between the eye part of the first image and the eye part of the second image. The processor 120 may identify the eye part in the second image as a point part when the difference is equal to or greater than a designated threshold level.

In an embodiment, at least a part of the image processing method may use an artificial intelligence model trained according to at least one of machine learning, a neural network, and a deep learning algorithm.

For example, in at least some of operation 310 of determining a target image, operation 320 of recommending and correcting a correction function set for each image, and operation 330 of identifying a point part, the processor 120 of the electronic device 100 may analyze an image using a learning model trained using an artificial intelligence algorithm. The processor 120 may interoperate or communicate with an external electronic device (e.g., a server) to use the learning model.

As a result of the image analysis, an image to be corrected (a target image) may be selected, a correction function set to be recommended for each image may be determined, or a point part in the image may be identified.

Hereinafter, for better understanding, a method of determining a correction function set to be recommended for each image using a learning model trained using an artificial intelligence algorithm will be specifically exemplified.

The processor 120 may select a target image by performing a scoring operation of calculating a score for each image and comparing results of scoring multiple images.

A selection method (e.g., the scoring method) of a target image for which a first correction function (e.g., upscaling) is to be recommended may, for example, be as follows.

First, an image smaller than a predetermined standard (e.g., 1M capacity or 1000×1000 size) may be selected as a target image. The processor 120 may analyze and score the target image (an input image), may upscale the image, and may analyze and score the upscaled image (an output image). When the difference between the input image and the output image as a result of scoring is equal to or greater than a predetermined value, the electronic device 100 may determine that there is an image correction effect and may recommend the first correction function.

A method for selecting a target image for which a second correction function (e.g., blur, low light, or hdr) is to be recommended may, for example, be as follows.

The processor 120 may select, as a target image, an image having a predetermined resolution range (e.g., 5 to 16 Mpx) among multiple images stored in the electronic device 100. The processor 120 may analyze and score the selected target image (an input image), may correct the image by applying the second correction function (e.g., blur, low light, or hdr), and then may analyze the corrected image (an output image) again. When the difference between the input image and the output image as a result of the scoring is equal to or greater than a predetermined value, the processor 120 may determine that there is an image correction effect, and may recommend the second correction function.

Hereinafter, in FIG. 4A and various embodiments, a button, a function button, a UI area, and a dialog box are illustrated as elements of a user interface or a screen, but the elements of the user interface or the screen may be expressed by other terms such as icons, menus, graphic elements, or visual elements. The function button, the UI area, and the dialog box illustrated as elements of the user interface or the screen are merely examples, and the number, arrangement, or layout of elements may be modified, changed, or applied in various ways. Screens according to various embodiments herein may be various types of screens (e.g., an application execution screen, a browser screen, a web screen, a full screen, a partial screen, and a camera preview screen) capable of being displayed on an electronic device or capable of being displayed to include content (e.g., an image or a video).

Figure 4A:
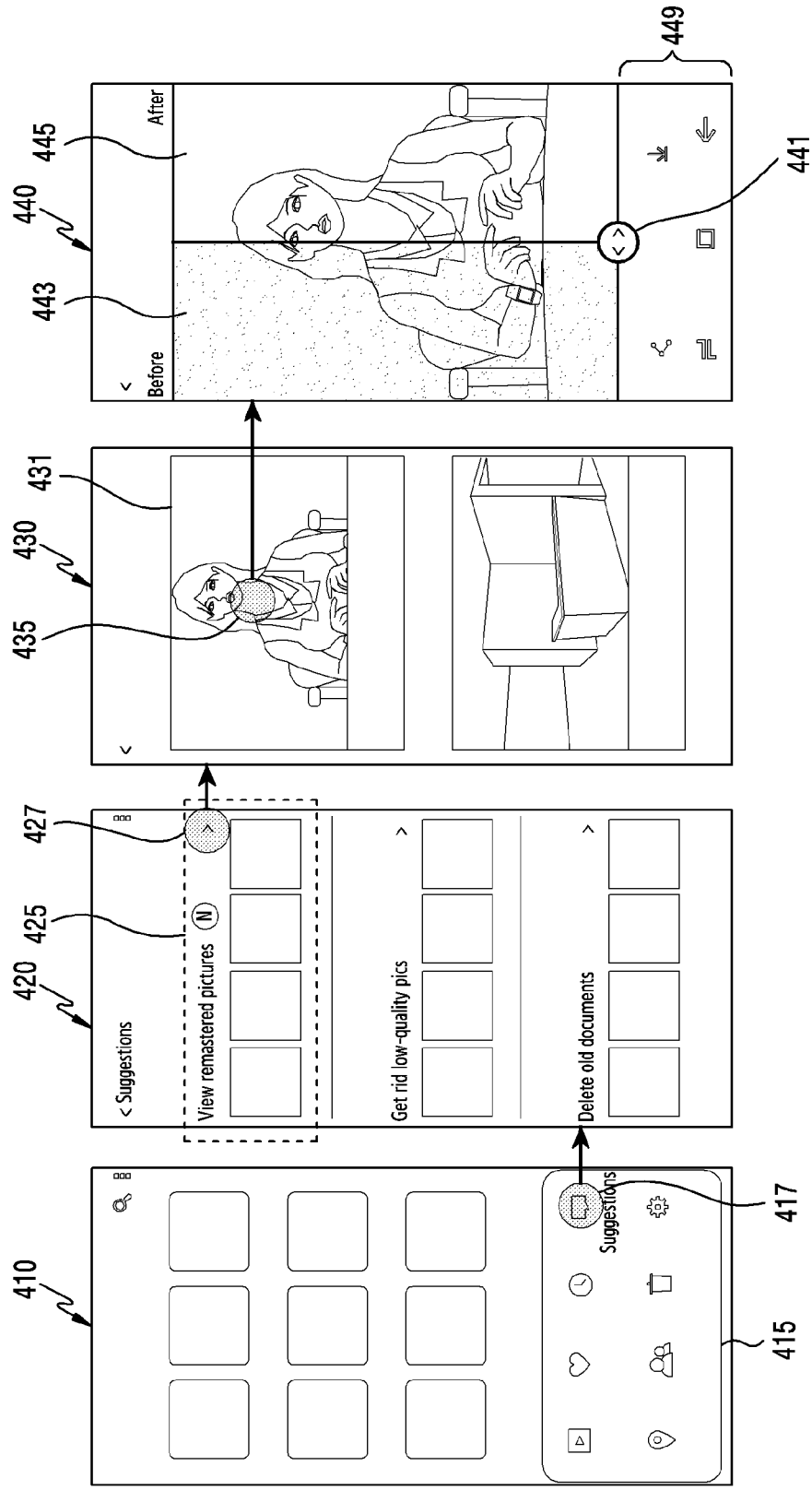
FIG. 4A illustrates an example user interface related to image processing in an electronic device according to various embodiments.

FIG. 4A illustrates an example user interface related to image processing in an electronic device according to various embodiments.

In FIG. 4A, reference numerals 410, 420, 430, and 440 illustrate screens that are sequentially switched according to user input.

For example, when an application (e.g., an album application, an editing application, or a camera application) is executed, a user interface such as a first screen 410 may be output on the display 110 of the electronic device 100.

A view area may be disposed on the first screen 410. Contents such as images and/or videos stored in the memory 130 of the electronic device 100 may be classified into multiple groups (e.g., classified by category, by type, by folder, or by date). A representative image(s) of each group may be displayed in the form of a thumbnail in the view area.

At the lower end of the first screen 410, a dialog box 415 for interaction with a user may be displayed. For example, according to a user input (e.g., a touch on a setting button) to an interaction area disposed at the lower end of a previous screen, a dialog box may be displayed in the interaction area. One or more function buttons for a user input may be disposed in the dialog box 415.

The dialog box 415 may include a function button 417 (hereinafter, a "recommendation button") for recommending image improvement. The first screen 410 may be switched to a second screen 420 by a user input (e.g., touch or tap) on the recommendation button.

According to a user input (e.g., touch or tap) for selecting the recommendation button 417 on the first screen 410, the first screen 410 may be switched to the second screen 420, and a UI area indicated by reference numeral 425 may be displayed within the second screen 420. The UI area 425 may show a list view of an improved-image group. For example, as illustrated, representative images (e.g., recent photos) in the group may be displayed in a list view form (e.g., displayed in a thumbnail state). One or more correction functions may be automatically recommended for each image included in the improved-image group.

The UI area 425 may include a navigation button 427 (e.g., a detailed view function button). The second screen 420 may be switched to a third screen 430 by a user input (e.g., a touch or a tap) on the navigation button 427.

The third screen 430 may be a screen showing a card view of the improved-image group. For example, representative images (e.g., recent photos) in the improved-image group may be displayed in a card view form (e.g., displayed in a preview state) on the third screen 430.

For example, images, among multiple stored images, which satisfy designated conditions (e.g., capacity of 1M or less, size of 1000×1000 or less, or resolution of 5 Mpx to 16 Mpx or less) may be automatically classified into an improved image group. A correction function set necessary for each image belonging to the improved-image group may be automatically recommended (or determined). The correction function set may include one or more correction functions (e.g., upscaling, brightness adjustment, or sharpness adjustment).

For example, each image in the improved-image group may be a corrected image obtained by applying the automatically recommended correction function set. An original image may be stored together with the corrected image.

Reference numeral 431 illustrates an image included in the improved-image group and selected according to a user input 435. On the third screen 430, the image 431 may be displayed in a preview state as illustrated.

When the user input 435 (e.g., touch, tap, or hovering) selecting the image 431 is performed on the third screen 430, an image viewer function may be executed, and the third screen 430 may be switched to a fourth screen 440.

The fourth screen 440 may be displayed on the display 110 by the execution of the image viewer function.

A view area may be disposed on the fourth screen 440. The view area may include a first view area 443 and a second view area 445. When the image 431 is selected on the third screen 430, the selected image 431 may be displayed in the view area within the fourth screen 440.

On the fourth screen 440, one image 431 may be displayed such that the original and corrected versions of the image 431 can be compared with each other. For example, when a first image is an original version of one image 431 and when a second image is a corrected version of the image 431, a first part of the first image may be displayed in the first view area 443, and a second part of the second image may be displayed in the second view area 445. As illustrated, the first part of the first image displayed in the first view area 443 and the second part of the second image displayed in the second view area 445 may be displayed so as to be combined to form one image.

A handler 441 dividing the two areas 443 and 445 may be disposed between the first view area 443 and the second view area 445. A part corresponding to the original image and a part corresponding to the corrected image may be distinguished from each other by the handler 441. An interaction area 449 may be disposed at the lower end of the fourth screen 440. One or more function buttons (e.g., a storage button, a share button, or a download button) may be included in the interaction area 449.

Figure 4B:
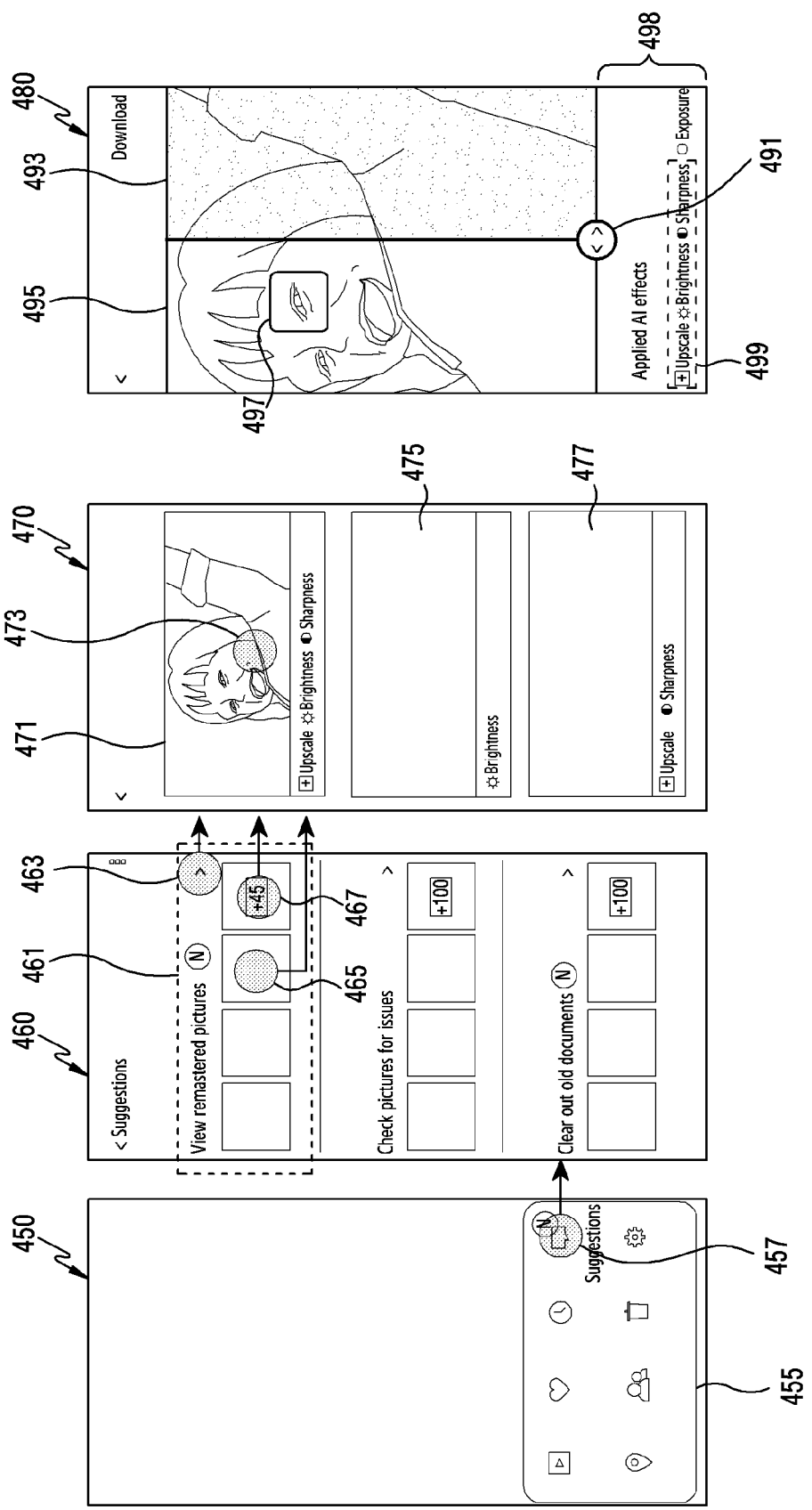
FIG. 4B illustrates an example user interface related to image processing in an electronic device according to various embodiments.

FIG. 4B illustrates an example user interface related to image processing in an electronic device according to various embodiments.

In FIG. 4B, reference numerals 450, 460, 470, and 480 illustrate screens that are sequentially switched by a user input.

For example, when an application (e.g., an album application, an editing application, or a camera application) is executed, a user interface such as a first screen 450 may be displayed on the display 110 of the electronic device 100.

A dialog box 455 for interaction with a user may be displayed at the lower end of the first screen 450. One or more function buttons for a user input may be disposed in the dialog box 455. The dialog box 455 may include a recommendation button 457 for recommending image improvement.

According to a user input (e.g., touch, tap, or hovering) selecting the recommendation button 457 on the first screen 450, the first screen 450 may be switched to a second screen 460. A UI area of reference numeral 461 may be displayed within the second screen 460. The UI area 461 may show a list view of an improved-image group. For example, as illustrated, representative images (e.g., recent photos) in the group may be displayed in a list view form (e.g., displayed in a thumbnail state). One or more correction functions may be automatically recommended for each image included in the improved-image group.

The UI area 461 may include a navigation button 463 (e.g., a detailed view function button). The second screen 460 may be switched to a third screen 470 by a user input on the UI area 461 (e.g., a first input on the navigation button 463, a second input 465 on an image in the improved-image group, or a third input 467 requesting to view more images in the group).

The third screen 470 may be a screen showing a card view of the improved-image group. For example, representative images (e.g., recent photos) in the improved-image group may be displayed in a card view form (e.g., displayed in a preview state) on the third screen 470.

A correction function set necessary or desirable for each image belonging to the improved-image group may be automatically recommended (or determined). The correction function set may include one or more correction functions (e.g., upscaling, brightness adjustment, or sharpness adjustment).

For example, each image in the improved-image group may be a corrected image obtained by applying the automatically recommended correction function set. An original image may be stored together with the corrected image.

Reference numeral 471 illustrates one image included in the improved-image group and selected according to the user input 473. On the third screen 470, the image 471 may be displayed in a preview state as illustrated.

In the third screen 470, reference numerals 471, 475, and 477 illustrate multiple images in an improved-image group. A different correction function set may be automatically recommended for each image. A correction in which the automatically recommended correction function set is applied to each image may be made. Multiple correction functions may be recommended for one image. For example, a first correction function set (e.g., upscaling, brightness adjustment, or sharpness adjustment) may be applied to the first image 471 among the images 471, 475, and 477 belonging to the improved-image group. In another example, a second correction function set (brightness adjustment) may be applied to the second image 475. In another example, a third correction function set (upscaling or sharpness adjustment) may be applied to the third image 477.

According to the user input 473 (e.g., touch, tap, or hover) selecting one image 471 on the third screen 470, an image viewer function may be executed, and the third screen 470 may be switched to a fourth screen 480.

The fourth screen 480 may be a screen displayed on the display 110 by the execution of the image viewer function.

A view area may be disposed on the fourth screen 480. The view area may include a first view area 493 and a second view area 495. When one image 471 is selected on the third screen 470, the selected image 471 may be displayed in the view area within the fourth screen 480.

On the fourth screen 480, the image 471 may be displayed so that a comparison of the original and corrected versions of the selected mage 471 is possible. For example, when a first image is an original version of one image 471 and when a second image is a corrected version of the image 471, a first part of the first image may be displayed in the first view area 493, and a second part of the second image may be displayed in the second view area 495. As illustrated, the first part of the first image displayed in the first view area 493 and the second part of the second image displayed in the second view area 495 may be displayed so as to be combined to form one image.

A handler 491 dividing the two areas 493 and 495 may be disposed between the first view area 493 and the second view area 495. A part corresponding to an original image and a part corresponding to a corrected image may be distinguished from each other by the handler 491. An indicator 497 indicating a point part in a corrected image may be included in the second view area 495 in which the corrected image is displayed.

An interaction area 498 may be disposed at the lower end of the fourth screen 480. Function buttons corresponding to multiple correction functions (e.g., upscale, brightness, sharpness, and exposure) used for correction may be displayed in the interaction area 498. A correction function set, pre-applied to an image being displayed within the view area of the fourth screen 480, among the multiple correction functions may be displayed (e.g., highlighted) in an activated state. The correction function set may include one or more correction functions. Reference numeral 499 illustrates a state in which three of the four available correction functions (e.g., upscale, brightness, and sharpness) are activated (or turned on). A correction function set (e.g., exposure), among the multiple correction functions, which has not been applied to the image being displayed within the view area of the fourth screen 480, may be displayed in a deactivated state (e.g., displayed by default).

Figure 5:
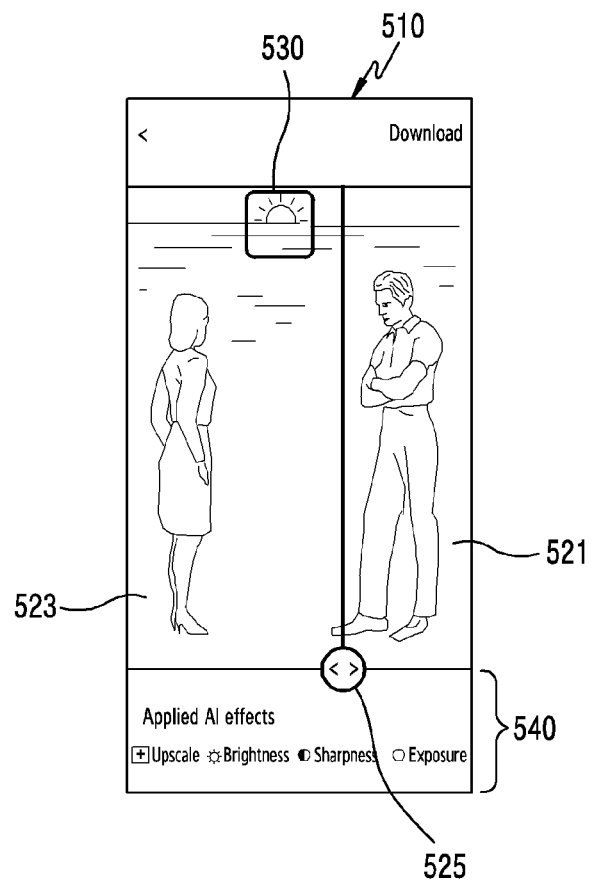
FIG. 5 illustrates an example screen showing an improved image in an electronic device according to an embodiment in an original comparison viewing scheme.

FIG. 5 illustrates an example screen showing an improved image in an electronic device according to an embodiment in an original comparison viewing scheme.

Referring to FIG. 5, a screen 510 may include a first view area 521, a second view area 523, an indicator 530, and a handler 525.

When displaying the indicator 530 indicating a point part (e.g., a most improved part, or a part having the highest scoring result according to evaluation criteria) of an image, the position (or default position) of the handler 525 may be automatically adjusted so that the handler 525 does not cover the point part.

When an original image is referred to as a first image and the corrected version of the image is referred to as a second image, a first part of the first image may be displayed in the first view area 521. A second part of the second image may be displayed in the second view area 523. As illustrated, on the screen 510, the first part of the first image as an original image and the second part of the second image as a corrected image may be displayed so as to be combined to form one image. The indicator 530 indicating a point part of the second image may be displayed in the second view area 523. The handler 525 dividing the first view area 521 and the second view area 523 may be displayed on the screen 510.

The screen 510 may include the handler 525 which enables the original image and the corrected image to be easily compared with each other. The point part may be focused through the indicator 530 indicating the point part (e.g., the most improved part or the part having the highest correction effect) on the screen 510. Through image analysis, a correction function set necessary for an image may be automatically recommended and applied, and correction may be performed. The indicator 530 indicating a point part, in the entire area of the image, for recommending an effect due to the correction, may be included in the image and displayed, and thus a user may easily and accurately recognize the image correction effect.

The position (e.g., default location) of the handler 525 may be adjusted based on the position of the point part. For example, as illustrated, the handler 525 may be displayed at a position outside the point part.

The handler 525 may have an image segmentation function. For example, as illustrated, the handler 525 may divide the first view area 521 and the second view area 523 from each other. The handler 525 may have a movement function. For example, the handler 525 may be moved to both sides (e.g., left and right) according to a user input (e.g., touch and swipe). According to a user input for moving the handler 525, the size of the first view area 521 and the size of the second view area 523 may be changed in conjunction with each other. When the size of the first view area 521 and the size of the second view area 523 are changed, the size of an image on the first view area 521 and the size of an image on the second view area 523 may be changed. For example, when the handler 525 is moved to the side (e.g., left) by a swipe motion, the size of the first view area 521 may increase by the distance moved by the handler 525, and the size of the second view area 523 may decrease in proportion thereto. The ratio and/or area of the first image and the second image displayed on the screen 510 may be changed depending on the movement of the handler 525 or the size change of the first view area 521 and the second view area 523 linked to the movement of the handler 525.

A hiding function for the handler 525 may be provided. For example, when the user touches the handler 525 and swipes same to the end of the side (e.g., left), the handler 525 may disappear from the screen 510.

The screen 510 may further include an interaction area 540. Function buttons corresponding to multiple correction functions (e.g., upscale, brightness, sharpness, and exposure) capable of being automatically recommended and applied may be displayed in the interaction area 540. For example, as illustrated, function buttons corresponding to a first correction function (e.g., upscaling), a second correction function (e.g., brightness adjustment), a third correction function (e.g., sharpness adjustment), and a fourth correction function (e.g., exposure adjustment) are provided in the interaction area 540.

According to a user input to the interaction area 540, each correction function applied to the second image as a corrected image may be turned on or off, and the second image being displayed in the second view area 523 may be updated. For example, when a function button corresponding to the second correction function (e.g., brightness adjustment) is touched once while the function button is turned on, the function button may be turned off. Accordingly, the second correction function pre-applied to the second image may be excluded, and the second image may be updated. The updated second image may be displayed through the second view area 523. When the function button corresponding to the second correction function (e.g., brightness) is touched again while the function button is turned off, the function button may be switched to a turned-on state. Accordingly, the correction function excluded from the second image may be applied again, and the second image may be updated once more.

The user may compare the original image and the corrected image through the screen 510, and easily, accurately, and intuitively determine how much and which part of the entire area of the image has been improved.

Figure 6:
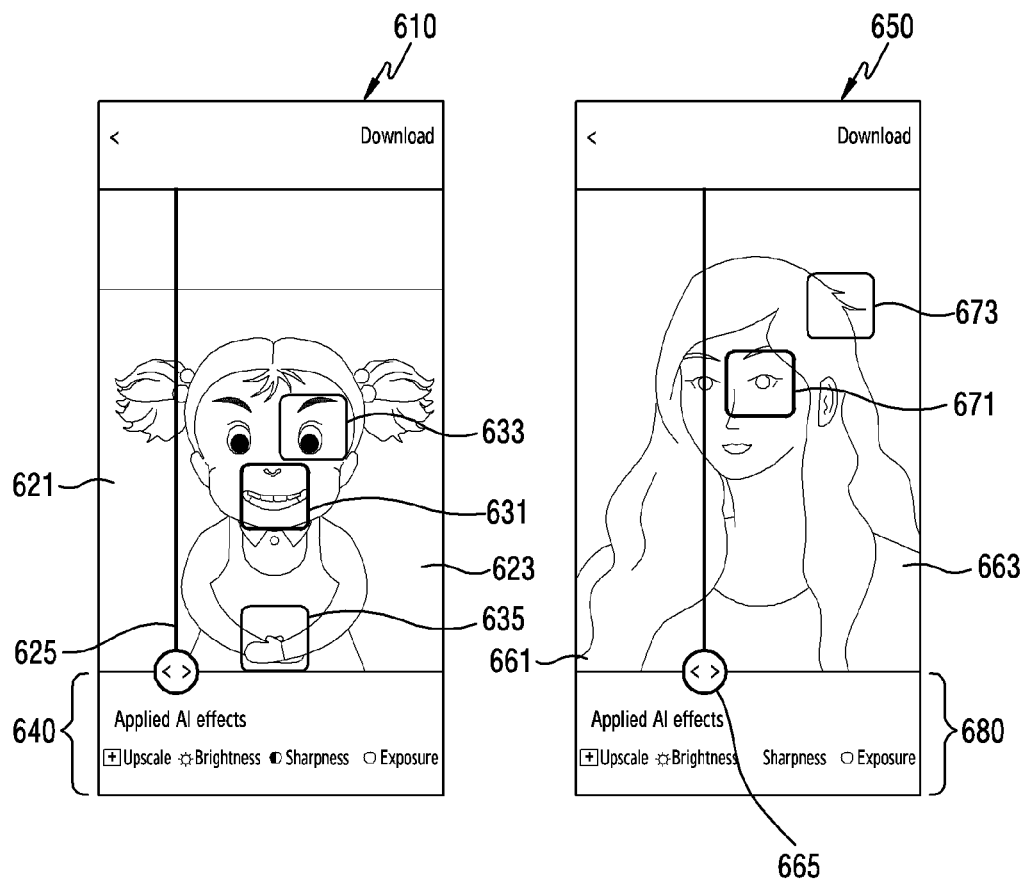
FIG. 6 illustrates example screens showing an improved image in an electronic device according to an embodiment in an original comparison viewing scheme.

FIG. 6 illustrates various example screens showing an improved image in an electronic device according to an embodiment in an original comparison viewing scheme.

Referring to FIG. 6, a first screen 610 may include a first view area 621, a second view area 623, multiple (e.g., three) indicators 631, 633, and 635, and a handler 625. For example, the multiple indicators 631, 633, and 635 may include a first indicator 631 indicating a first point part (e.g., a mouth part), a second indicator 633 indicating a second point part (e.g., an eye part), and a third indicator 635 indicating a third point part (e.g., a hand part).

When correction is performed by automatically recommending and applying a correction function set for one image, multiple point parts (e.g., well-improved parts, or parts for which a scoring result according to an evaluation criterion is equal to or greater than a threshold value) may be provided in the image by the correction. The indicators 631, 633, and 635 indicating the multiple point parts may be displayed.

When an original version of one image is referred to as a first image and a corrected version of the image is referred to as a second image, a first part of the first image may be displayed in the first view area 621. A second part of the second image may be displayed in the second view area 623. As illustrated, on the first screen 610, the first part of the first image and the second part of the second image may be displayed so as to be combined to form one image. The multiple indicators 631, 633, and 635 indicating point parts of the second image may be displayed in the second view area 623.

The handler 625 dividing the first view area 621 and the second view area 623 may be displayed on the first screen 610. The handler 625 may support easy comparison between the original version and the corrected version.

When there are multiple point parts in an image, the position of the handler 625 may be adjusted based on the positions of the multiple point parts. For example, the handler 625 (e.g., default position) may be automatically adjusted so as not to cover point parts. The handler 625 may be adjusted to be displayed in a position in which there is no point part. In another example, the handler 625 may be adjusted to be displayed at a position in the second image where the number of point parts is the smallest or the total area of the point parts is the smallest.

The first screen 610 may further include an interaction area 640. Function buttons corresponding to multiple correction functions (e.g., upscale, brightness, sharpness, and exposure) capable of being automatically recommended and applied may be displayed in the interaction area 640.

The second screen 650 may include a first view area 661, a second view area 663, multiple (e.g., two) indicators 671 and 673, and a handler 665. For example, the multiple indicators 671 and 673 may include a first indicator 671 indicating a first point part (e.g., an eye part) and a second indicator 673 indicating a second point part (e.g., a hair part).

The second screen 620 may further include an interaction area 680. Function buttons corresponding to multiple correction functions (e.g., upscale, brightness, sharpness, and exposure) capable of being automatically recommended and applied may be displayed in the interaction area 680.

Figure 7:
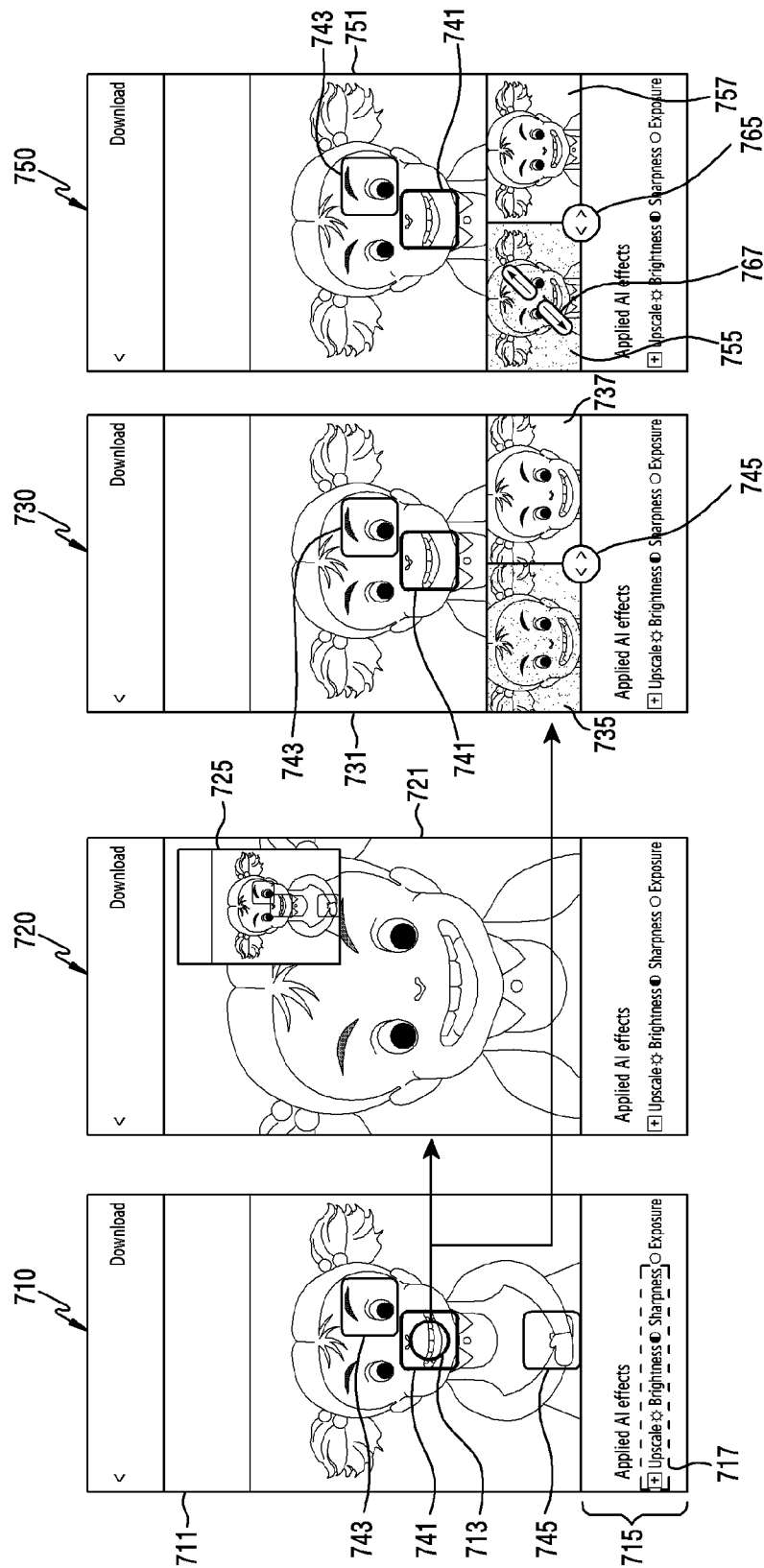
FIG. 7 illustrates example screens showing an improved image in an electronic device according to various embodiments in an enlargement display scheme.

FIG. 7 illustrates various example screens showing an improved image in an electronic device according to an embodiment in an enlargement display method.

In the illustration in FIG. 7, reference numerals 710, 720, 730, and 750 may be screens displayed on the electronic device 100.

A first screen 710 may include a view area 711 and an interaction area 715. An image (e.g., a corrected image or an improved image) may be displayed in the view area 711. The view area 711 may include at least one indicator (at least one of 741, 743, and 745) indicating at least one point part in the image. For example, a first indicator 741 corresponding to a first point part (e.g., a mouth part), a second indicator 743 corresponding to a second point part (e.g., an eye part), and a third indicator 745 corresponding to a third point part (e.g., a hand part) may be displayed.

The first screen 710 may include the interaction area 715. Function buttons corresponding to multiple correction functions (e.g., upscale, brightness, sharpness, exposure) capable of being automatically recommended and applied may be displayed in the interaction area 715. For example, as illustrated, function buttons corresponding to a first correction function (e.g., upscale), a second correction function (e.g., brightness), a third correction function (e.g., sharpness), and a fourth correction function (e.g., exposure) may be displayed in the interaction area 715.

When some (e.g., upscale, brightness, and sharpness) of the correction functions in the interaction area 715 are automatically recommended and applied to an image, function buttons 717 corresponding to the applied correction functions may be activated and displayed (e.g., highlighted). Each correction function may be easily selected or excluded using the interaction area 715.

The first screen 710 may be switched to a second screen 720 or a fourth screen 750 by a user input 713 selecting a point part in an image being displayed.

For example, when the user input 713 (e.g., touch, tap, or hovering) on the first indicator 741 is made on the first screen 710, the second screen 720 may be displayed. A view area 721 and a map 725 included in the view area 721 may be displayed on the second screen 720. An image may be enlarged about the selected first point part (e.g., the mouth portion) and displayed. The map 725 displaying information on which part of the entire area of the image is the selected point part may be provided on the upper end of the second screen 720. In response to the user input 713 selecting one point part among at least one point part in the image, a part corresponding to the selected point part in the image may be enlarged and displayed in the view area 721, and the map 725 guiding the position of the selected point part in the entire area of the image may be displayed.

In another example, when the user input 713 (e.g., touch, tap, or hovering) on the first indicator 741 is input on the first screen 710, the fourth screen 750 may be displayed.

The fourth screen 750 may include a first view area 751, a second view area 755, and a third view area 757. When a specific point area (e.g., a mouth) is selected on the first screen 710, the fourth screen 750 providing an enlarged view about the selected point area along with original comparison viewing may be displayed.

An enlarged view of an image may be provided through the first view area 751. The fourth screen 750 may simultaneously display a first image, which is an original version of the image, and a second image, which is a corrected version of the image. The first image and the second image may be simultaneously displayed through the second view area 755 and the third view area 757. A handler 765 may be disposed between the second view area 755 and the third view area 757.

When a user input (e.g., zoom or move) is made in one of the first image and the second image, a change according to the user input may be synchronously reflected on both the first image and the second image. For example, when the user inputs a user input 767 (e.g., pinch-out) in one of the second view area 755 and the third view area 757 in order to see how much a face part has been modified, both the original version and the corrected version in both the second view area 755 and the third view area 757 may be enlarged and displayed about the face part. When there is a user input (e.g., zoom or move) in the first view area 751, a change according to the user input may be simultaneously reflected in all of the first view area 751, the second view area 755, and the third view area 757. The user may freely change parts to be enlarged and compared in an image being displayed, and may intuitively determine an original version and a corrected version of the image before and after correction.

When the user input 767 (e.g., pinch-out) occurs in the second view area 755 of the fourth screen 750, the fourth screen 750 may be switched to a third screen 730.

Like the fourth screen 750, the third screen 730 may include a first view area 731, a second view area 735, a third view area 737, and a handler 745. An indicator 741 corresponding to a selected point part and a part or all of an image including the indicator 741 may be displayed in the first view area 731. A first part in the first image (original version) corresponding to the selected point part may be displayed in the second view area 735. A second part in the second image (corrected version) corresponding to the selected point part may be displayed in the third view area 737. States before or after correction regarding image parts (the first part in the first image and the second part in the second image) corresponding to the point part may be compared through the second view area 735 and the third view area 737.

The handler 745 may be disposed between the second view area 735 and the third view area 737. The size of the second view area 735 and the size of the third view area 737 may be changed in conjunction with each other depending on a user input (e.g., touch and swipe) moving the handler 745. The user may manipulate the handler 745 to easily compare and view a part corresponding to the first image, which is the original version, and a part corresponding to the second image, which is the corrected version.

Figure 8:
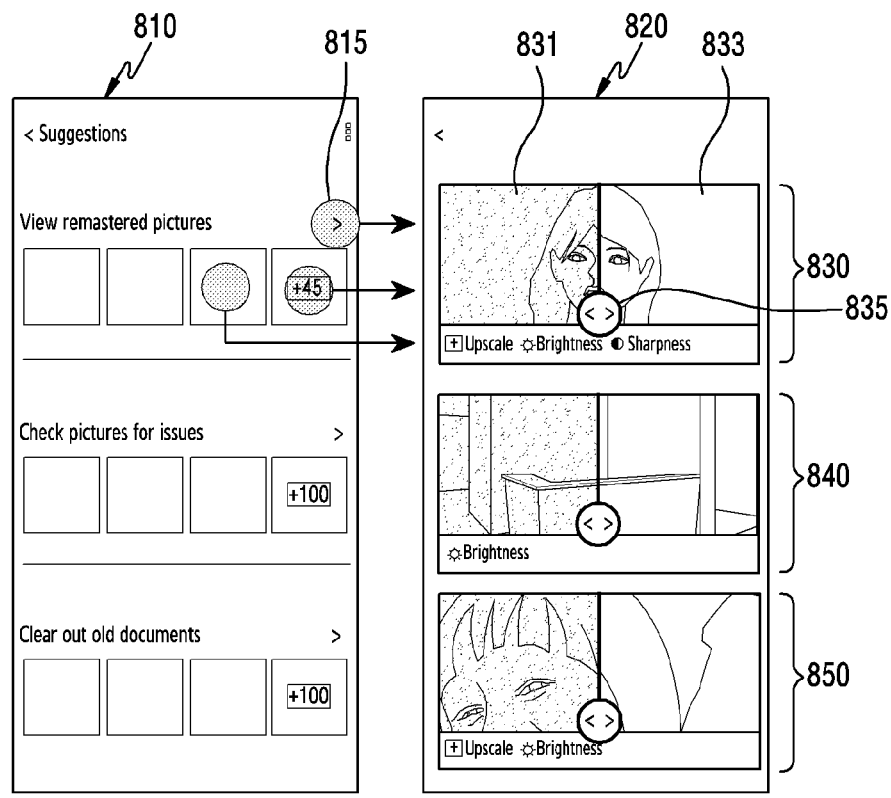
FIG. 8 illustrates example screens for describing an image improvement recommendation function in an electronic device according to various embodiments.

FIG. 8 illustrates example screens for describing an image improvement recommendation function in an electronic device according to an embodiment.

In FIG. 8, reference numerals 810 and 820 may be screens displayed on the electronic device 100. For example, when an image improvement function is selected during execution of an application (e.g., an album application, an editing application, or a camera application) (e.g., when there is a user input regarding the recommendation button 457), a first screen 810 may be displayed on the display 110 of the electronic device 100.

The first screen 810 may correspond to the second screen 420 in FIG. 4A or the second screen 460 in FIG. 4B.

The first screen 810 may include a navigation button 815.

When the navigation button 815 is selected on the first screen 810, the first screen 810 may be switched to a second screen 820.

The second screen 820 may be a screen showing images in an improved-image group as previews.

When displaying multiple automatically classified images in the improved-image group, the electronic device 100 may provide an original image and an improved image on one screen. Information about a correction function set applied to the improved image may also be provided.

For example, representative images (e.g., recent photos) in the improved-image group may be displayed in a card view form (e.g., displayed as a preview) on the second screen 820. Areas of reference numerals 830, 840, and 850 indicate user interfaces displaying images included in the improved-image group.

A preview of a first image is displayed in a first area 830. The first area 830 may include a first view area 831, a second view area 833, and a handler 835. A first part of an original image may be displayed in the first view area 831. A second part of a corrected image may be displayed in the second view area 833. The first part of the original image displayed in the first view area 831 and the second part of the corrected image displayed in the second view area 833 may be displayed so as to be combined to form one image. A user may manipulate the handler 835 to freely change the size of the first view area 831 and the second view area 833, and to intuitively compare and view states of the image before and after correction.

A preview of a second image is displayed in a second area 840. A preview of a third image is displayed in a third area 850.

As illustrated, in the areas 830, 840, and 850, one or more correction buttons (e.g., an upscaling button, a brightness adjustment button, a sharpness adjustment button, and an exposure adjustment button) corresponding to correction function sets applied to correction of respective images may be displayed together. A correction button corresponding to a correction function pre-applied to the image may be displayed in an activated state. For example, upscaling, brightness adjustment, and sharpness adjustment may have been reflected in the first image displayed in the first area 830. Brightness adjustment may have been reflected in the second image displayed in the second area 840. Upscaling and brightness adjustment may have been reflected in the third image displayed in the third area 850.

According to a user input, a correction function applied to each image may be turned on or off to update the displayed image. For example, when a function button corresponding to a specific correction function (e.g., brightness) is touched once while the function button is turned on in the first area 830, the function button may be switched to a turned-off state. Accordingly, the second image being displayed in the second view area 833 may be updated, and the second image may be displayed without the pre-applied correction function. When the function button corresponding to the specific correction function (e.g., brightness) is touched once more while the function button is turned off, the function button may be switched to a turned-on state. Accordingly, the second image being displayed in the second view area 833 is updated again, and the second image may be displayed with the correction function applied again.

Figure 9:
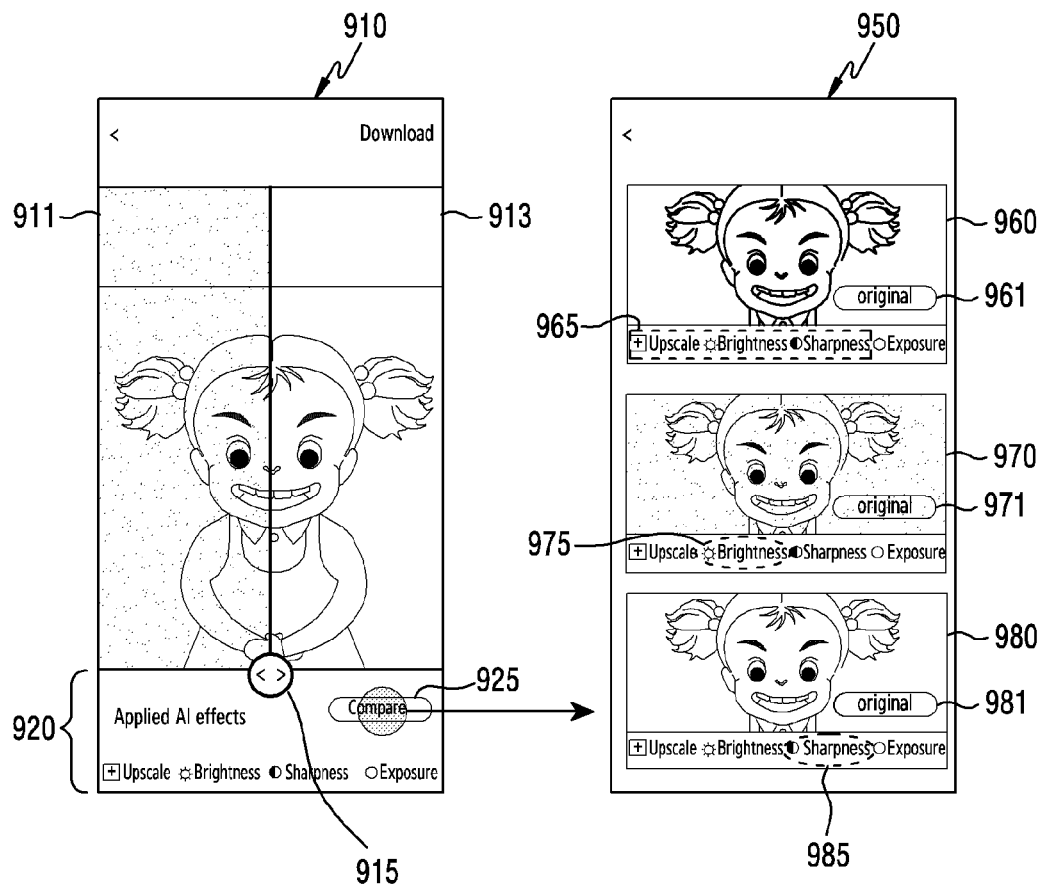
FIG. 9 illustrates example screens showing correction functions in an electronic device according to various embodiments.

FIG. 9 illustrates example screens showing correction functions in an electronic device according to various embodiments.

In the illustration in FIG. 9, reference numerals 910 and 950 may be screens displayed on the electronic device 100.

A first screen 910 may include a first view area 911, a second view area 913, and a handler 915. An original version and a corrected version of an image may be displayed through the first view area 911 and the second view area 913. A first part of the original image may be displayed in the first view area 911. A second part of the corrected image (or the improved image) may be displayed in the second view area 913. The first part of the original image and the second part of the corrected image may be displayed to form one image. The handler 915 may be disposed between the first view area 911 and the second view area 913.

The first screen 910 may include an interaction area 920. The interaction area 920 may include a first function button 925 for original comparison viewing.

In order to request a comparison of the correction effect, a user input (e.g., touch, tap, or hovering) to select the first function button 925 may occur.

When the first function button 925 is selected, the first screen 910 may be switched to a second screen 950.

In response to the user input (e.g., touch, tap, or hovering on the first function button 925) requesting the correction effect comparison, the electronic device 100 may acquire one or more images 960, 970, and 980 to which one or more correction functions applied to the corrected image has been separately applied. The second screen 950, in which the one or more images 960, 970, and 980 are compared and shown, may be displayed through the display 110.

In the second area 950, multiple images 960, 970, and 980, in which different correction function sets have been applied to an image displayed in the first area 910, are displayed in a card view form (e.g., a preview state). Reference numerals 960, 970 and 980 indicates images corrected according to the different correction function sets. For example, in the second screen 950, a first image 960, to which a first correction function set 965 has been applied, a second image 970, to which a second correction function set 975 has been applied, and a third image 980, to which a third correction function set 985 has been applied, may be displayed. The correction function sets applied to the images 960, 970, and 980 may be displayed together with the images. Also, second function buttons 961, 971, and 981 for viewing the original image may be provided in the second area 950.

With respect to multiple correction functions applied to one image through the second screen 950, the user may turn on or off each correction function to compare and view states before and after application of each correction function.

Figure 10:
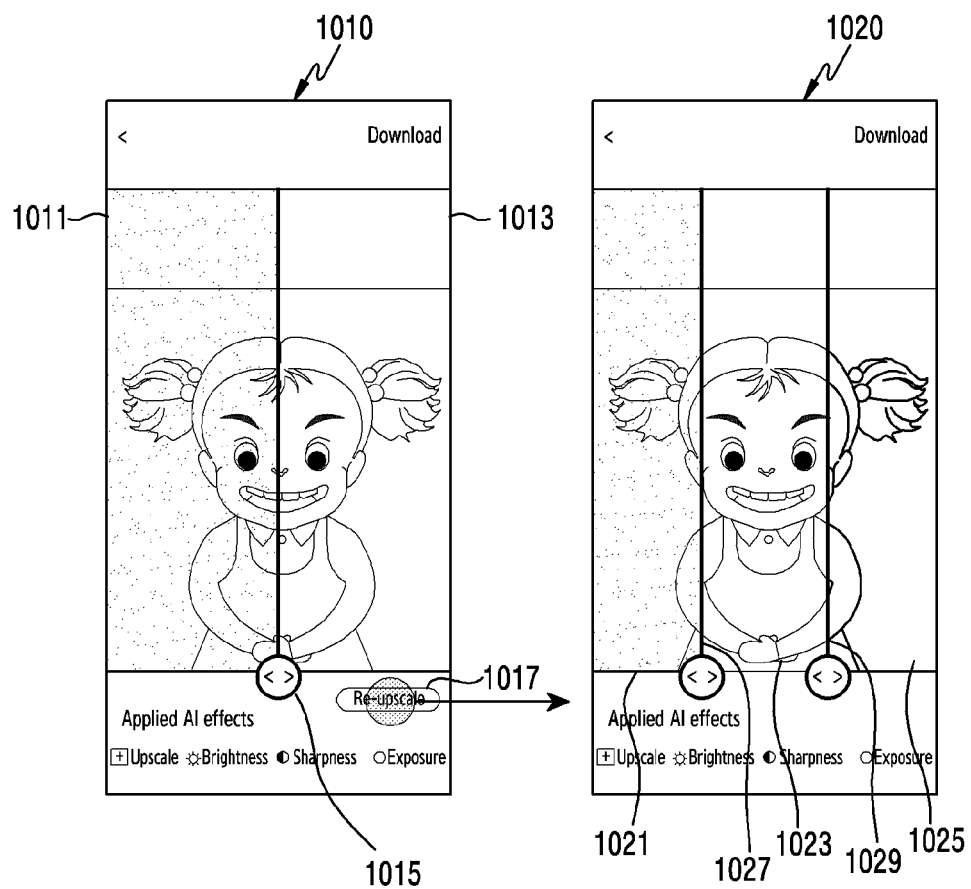
FIG. 10 illustrates example screens showing a result of repeated application of a correction function in an electronic device according to various embodiments.

FIG. 10 illustrates example screens showing a result of repeated application of a correction function in an electronic device according to various embodiments.

In the illustration in FIG. 10, reference numerals 1010 and 1020 may be screens of the electronic device 100. A first screen 1010 may include a first view area 1011, the second view area 1013, and a handler 1015. A first part of a first image, which is an original version, may be displayed in the first view area 1011. A second part of a second image, which is a corrected version, may be displayed in the second view area 1013. The first part of the first image and the second part of the second image may be displayed to form one image. The handler 1015 may be disposed between the first view area 1011 and the second view area 1013.

The first screen 1010 may include a function button 1017 (e.g., a re-upscaling button) for repeated application of a correction function.

A user may perform correction by applying a desired correction function (e.g., upscaling) several times through the function button 1017, and may view images of correction steps while comparing the images within one screen through the handlers 1015, 1027, and 1029.

In order to request repeated application of a pre-applied correction function, a user input (e.g., touch, tap, or hovering) to select the function button 1017 may occur. For example, in the case of an image capable of additional upscaling, re-upscaling may be additionally recommended. In this case, the function button 1017 for re-upscaling may be displayed on the first screen 1010. When the function button 1017 is selected, re-upscaling of an image being displayed on the first screen 1010 may be performed.

When the function button 1017 is selected, the first screen 1010 may be switched to a second screen 1020. In response to the user input selecting the function button 1017 in order to request repeated application of the pre-applied correction function, the second screen 1020 may be displayed.

The second screen 1020 may compare and display multiple images according to the re-upscaling state.

The second screen 1020 may include a first view area 1021, a second view area 1023, a third view area 1025, a first handler 1027, and a second handler 1029. A first part of a first image, which is an original version, may be displayed in the first view area 1021. A second part of a second image in a state in which a correction function has been applied (e.g., an upscaled state) may be displayed in the second view area 1023. A third part of a third image in a state in which a correction function has been repeatedly applied (a re-upscaled state) may be displayed in the third view area 1025. The first handler 1027 may be disposed between the first view area 1021 and the second view area 1023 to divide the first view area 1021 and the second view area 1023 from each other. The second handler 1029 may be disposed between the second view area 1023 and the third view area 1025 to divide the second view area 1023 and the third view area 1025 from each other.

As illustrated, on the second screen 1020, the first part of the first image, the second part of the second image, and the third part of the third image may be displayed so as to be combined to form one image.

Figure 11:
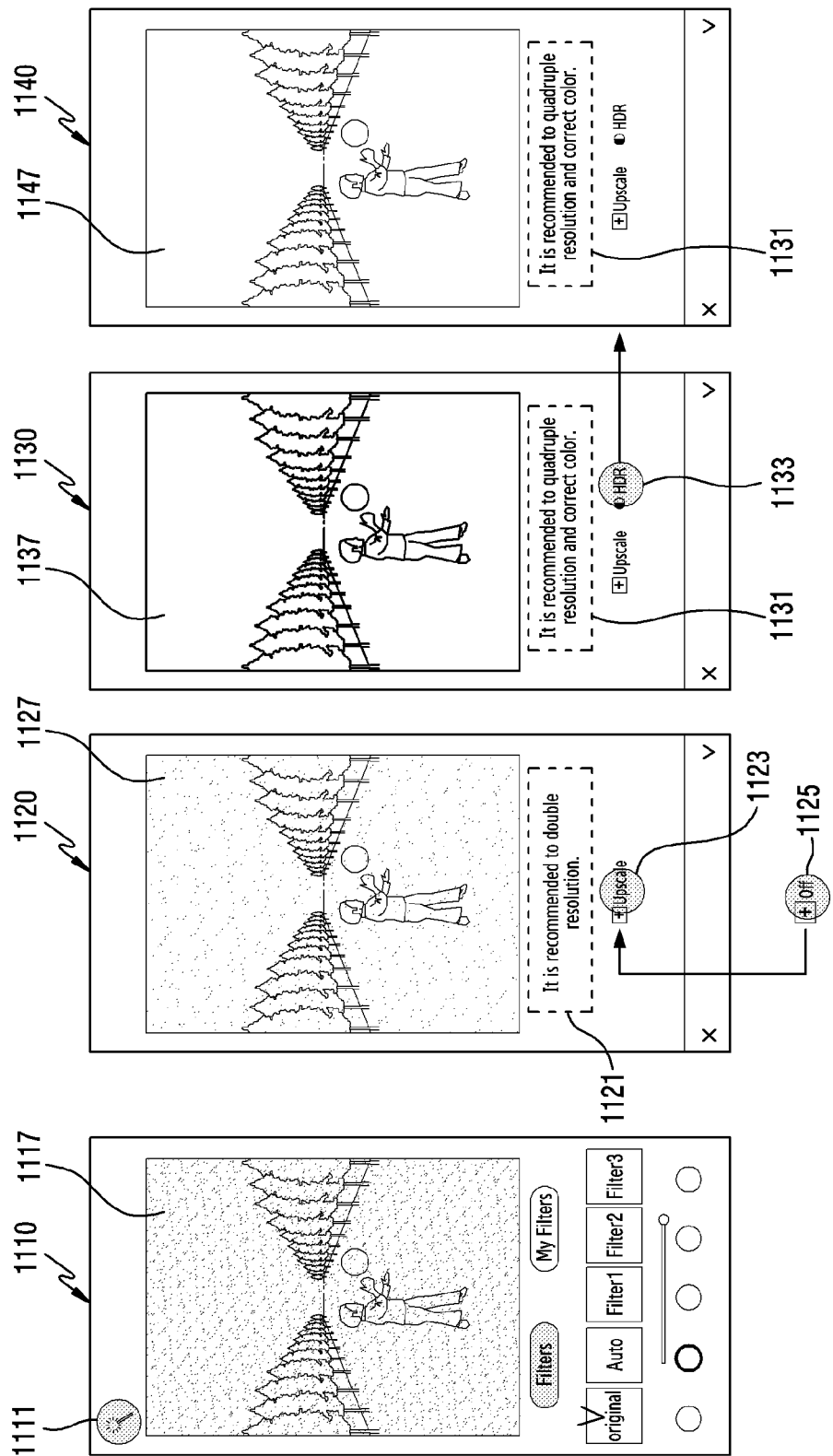
FIG. 11 illustrates example screens for describing an image editing function in an electronic device according to various embodiments.

FIG. 11 illustrates example screens for describing an image editing function in an electronic device according to various embodiments.

When an image editing function is executed, a first screen 1110 may be displayed. An original image 1117 to be edited and a function button 1111 for a filtering function may be displayed on the first screen 1110. When the function button 1111 is selected, analysis of the original image 1117 may be performed.

Through the image analysis, a filter option set necessary or desirable for the original image 1117 may be determined from among multiple providable filter options (e.g., tone improvement, upscaling, low light, high dynamic range (hdr) correction, blur, noise removal, and detail improvement) and automatically recommended.

When upscaling is automatically recommended as a result of the image analysis, the first screen 1110 may be switched to a second screen 1120. The second screen 1120 may be a screen for recommending the upscaling.

A message window 1121 recommending an increase in resolution through upscaling may be displayed on the second screen 1120. An image 1127 obtained by applying upscaling to the original image 1117 may be displayed on the second screen 1120.

A function button 1123 for upscaling may be included in the second screen 1120. The function button 1123 may be used to turn on or off a filter option for upscaling. For example, when a tap on the function button 1123 is input, the resolution of the original image 1117 may be increased by a predetermined multiple number. The multiple may be arbitrarily configured, and each tap may increase the resolution by a predetermined multiple (e.g., one tap upscales the original image 1117 by a factor of 2, and two taps upscales the original image 1117 by a factor of 4). When the function button 1123 is turned off, the display may be changed to the same state as 1125. The same input method may be applied to other filter options (e.g., hdr correction).

When upscaling and hdr correction are automatically recommended as a result of the image analysis, the first screen 1120 may be switched to a third screen 1130. The third screen 1130 may be a screen that recommends upscaling and hdr correction.

A message window 1131 recommending upscaling and hdr correction may be displayed on the third screen 1130. An image 1137 obtained by applying the upscaling and the hdr correction to the original image 1117 may be displayed on the third screen 1130. A function button 1131 for upscaling and a function button 1133 for hdr correction may be included in the third screen 1130.

The function button 1133 may be used to turn on or off a filter option for hdr correction. For example, when a tap on the function button 1133 is input, a hdr correction filter previously applied to the image 1137 may be excluded, and the image 1137 may be updated.

When a tap on the function button 1133 is input while the third screen 1130 is displayed, the third screen 1130 may be switched to a fourth screen 1140. An image 1147 in the fourth screen 1140 indicates an image from which the hdr correction filter has been excluded.

If the resolution is upscaled at a predetermined magnification (e.g., horizontal 4 times (×4), vertical 4 times (×4)) when performing the image improvement recommendation function, an appropriate resolution may be recommended according to an image state when performing the image editing function. For example, upscaling may be performed at different magnifications (e.g., 1.5×, 2×, 4×) depending on image sizes.

Figure 12:
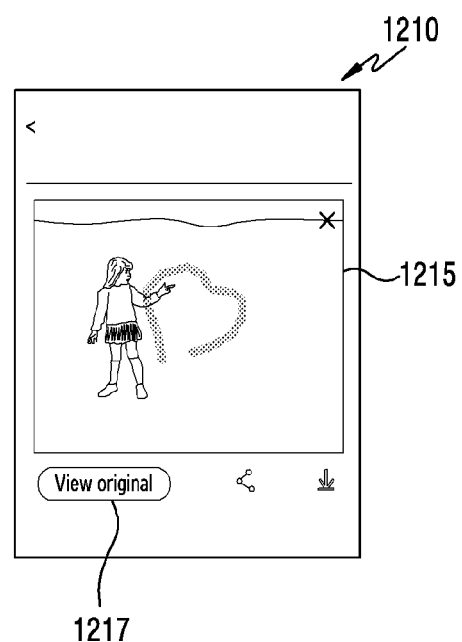
FIG. 12 illustrates an example in which an original image is displayed on a screen of an electronic device according to various embodiments.
Figure 13:
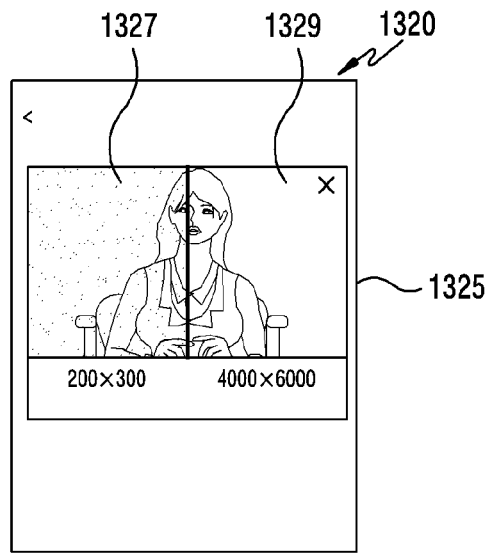
FIG. 13 illustrates an example in which an original image is displayed on a screen of an electronic device according to various embodiments.
Figure 13:
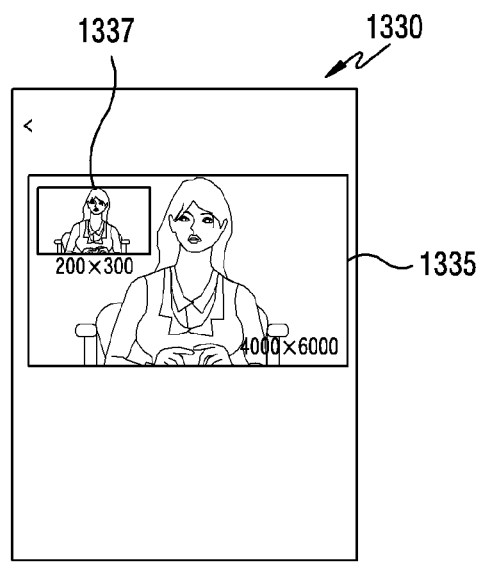
Figure 14:
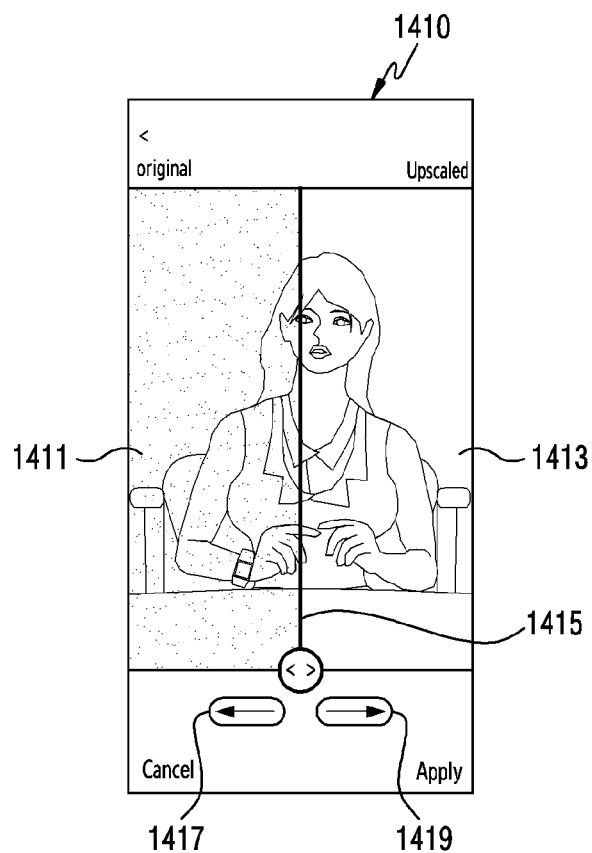
FIG. 14 is an example in which an original image is displayed on a screen of an electronic device according to various embodiments.

FIGS. 12, 13, and 14 below illustrate various examples of original comparison viewing schemes.

FIG. 12 illustrates an example in which an original image is displayed on a screen of an electronic device according to various embodiments. Referring to FIG. 12, an improved image 1215 may be displayed alone in a view area of a screen 1210. A function button 1217 for viewing the original on the screen 1210 may be provided. The original image of the improved image 1215 may be imported and displayed using the function button 1217.

FIG. 13 illustrates an example in which an original image is displayed on a screen of an electronic device according to various embodiments.

A first screen 1320 is an example of a screen in which a view area is divided and an original image and an improved image are compared and displayed. Reference numeral 1327 is a first view area showing a first part of an original image. Reference numeral 1329 is a second view area showing a second part of an improved image. Attributes (e.g., resolution, 200×300) of the original image and attributes (e.g., resolution, 4000×6000) of the improved image may be displayed together. As illustrated, an image part in the first view area 1327 and an image part in the second view area 1329 may be displayed to form one image.

A second screen 1330 is an example of a screen displaying an original image and an improved image in a picture-in-picture (PiP) scheme. An improved image may be disposed in a first view area 1335 of the second screen 1330. An original image may be placed in a second view area 1337 that is a part of the first view area 1335.

FIG. 14 is an example in which an original image is displayed on a screen of an electronic device according to various embodiments.

In a screen 1410, a view area may be divided into a first view area 1411 and a second view area 1413. An original image may be displayed in the first area 1411. An improved image of the original image may be displayed in the second area 1413. A handler 1415 enabling comparison between the original image and the improved image may be displayed in the screen 1410.

Depending on a user input (e.g., left swipe 1417 or right swipe 1419) to the handler 1415, the sizes of the first view area 1411 and the second view area 1413 may be changed in conjunction with each other. The area of the original image displayed in the first view area 1411 and the area of the improved image displayed in the second view area 1413 may be changed in conjunction with each other.

When a user input is received in one of the first view area 1411 and the second view area 1413, image display states in both the first view area 1411 and the second view area 1413 may be synchronously changed in response to the user input. For example, when there is a zoom-in input for enlargement in the second view area 1413, an image part in the first view area 1411 and an image part in the second view area 1413 may be synchronized and simultaneously enlarged.

Figure 15:
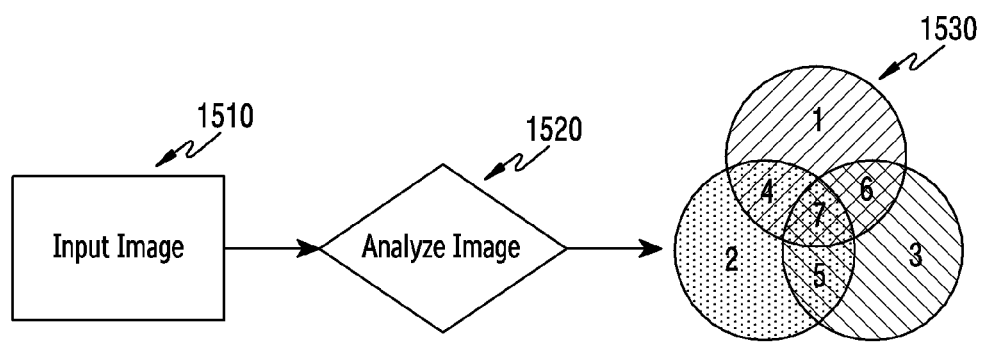
FIG. 15 illustratively shows example correction functions applied to an image processing method of an electronic device according to various embodiments.

FIG. 15 illustratively shows correction functions applied to an example image processing method of an electronic device according to various embodiments.

Referring to FIG. 15, an image processing method of an electronic device according to an embodiment may include operations 1510, 1520, and 1530.

In operation 1510, the electronic device 100 may receive an image (an original image or an input image).

In operation 1520, the electronic device 100 may analyze the image.

In operation 1530, the electronic device 100 may recommend (or determine) a correction function set for the image from among multiple providable correction functions. The correction function set may include one or more correction functions.

An upscaling function may be included as a correction function that is capable of being provided by the electronic device 100.

At least a part of the upscaling operation may use an artificial intelligence model trained based on at least one of machine learning, a neural network, or a deep learning algorithm.

For example, an upscaling operation using a learning model learned using an artificial intelligence algorithm is possible. The electronic device 100 may apply a target image to the learning model to upscale the image. For example, the electronic device 100 may extract a feature map of information about the edge, luminance, shadow, and texture of a target image and transform noise generated during compression of the image. After the image is upscaled, the quality of the upscaled image may be corrected using the extracted feature map. The learning model may be used to extract the feature map and correct the image quality using the feature map. Due to the use of the learning model, image distortion may be prevented (or reduced) from occurring during an upscaling operation or a re-upscaling operation, and high sharpness may be obtained.

In another example, upscaling using a rule model is possible. For example, an average value of neighboring pixel values or an interpolation curve of neighboring pixels may be calculated, and a new pixel may be generated using the interpolation curve.

An image (an improved image or an output image) may be acquired through a correction in which the correction function set recommended in operation 1530 is applied.

For example, when three correction functions (e.g., upscale, hdr, and low light) are providable, multiple correction function sets obtained by combining the three correction functions may be recommended for each image and applied during correction.

For example, when three correction functions (e.g., upscale, hdr, and low light) are providable, seven combinations, i.e., a first correction function set (e.g., upscale), a second correction function set (e.g., hdr), a third correction function set (e.g., low light), a fourth correction function set (e.g., upscale+hdr), a fifth correction function set (e.g., hdr+low light), a sixth correction function set (e.g., upscale+low light), and a seventh correction function set (e.g., upscale+hdr+low light), are possible.

Seven groups (first to seventh groups, or subgroups within an improved image group) corresponding to the correction function sets may be configured, and each of multiple images stored in the electronic device 100 may be analyzed to determine a correction function set to be recommended for each image. The electronic device 100 may automatically classify a group to which each image is to belong according to the recommended correction function sets.

An image with no correction function set to be recommended may be classified as an eighth group. Correction (or change) may not be applied to the image (e.g., a photo) belonging to the eighth group.

In an embodiment, the electronic device 100 may automatically recommend a correction function set necessary for a target image, and may apply the recommended correction function set to the image to correct the image. Accordingly, a high-quality image may be provided regardless of the state of the original image.

For example, in a photo incorrectly taken by a user, there may be a first part, which is very dark, or a second part, which is blurred. In this case, brightness adjustment and sharpness adjustment among multiple correction functions may be automatically recommended and applied to the photo so that the photo is corrected into a high-quality photo. The user may intuitively recognize the brightness improvement effect of the first part through a first indicator indicating the corrected first part. The user may intuitively recognize the sharpness improvement effect of the second part through a second indicator indicating the corrected second part.

For example, a photo shared by users during use of a messenger application may be received as a low-quality photo even when the original transmitted by a sender is a high-quality photo. In this case, brightness adjustment and sharpness adjustment among the multiple correction functions may be automatically recommended and applied to the photo so that the picture is corrected into a high-quality photo. The user may be provided with a photo that has been corrected to be as sharp and clear as the original.

FIG. 16 is a block diagram 1600 illustrating an example camera module 1780 (see FIG. 17) according to various embodiments. Referring to FIG. 16, the camera module 1780 may include a lens assembly 1610, a flash 1620, an image sensor 1630, an image stabilizer 1640, memory 1650 (e.g., buffer memory), or an image signal processor 1660. The lens assembly 1610 may collect light emitted or reflected from an object whose image is to be taken. The lens assembly 1610 may include one or more lenses. According to an embodiment, the camera module 1780 may include a plurality of lens assemblies 1610. In such a case, the camera module 1780 may form, for example, a dual camera, a 360-degree camera, or a spherical camera. Some of the plurality of lens assemblies 1610 may have the same lens attribute(s) (e.g., view angle, focal length, auto-focusing, f number, or optical zoom), or at least one lens assembly may have one or more lens attributes different from those of another lens assembly. The lens assembly 1610 may include, for example, a wide-angle lens or a telephoto lens.

The flash 1620 may emit light that is used to reinforce light reflected from an object. According to an embodiment, the flash 1620 may include one or more light emitting diodes (LEDs) (e.g., a red-green-blue (RGB) LED, a white LED, an infrared (IR) LED, or an ultraviolet (UV) LED) or a xenon lamp. The image sensor 1630 may obtain an image corresponding to an object by converting light emitted or reflected from the object and transmitted via the lens assembly 1610 into an electrical signal. According to an embodiment, the image sensor 1630 may include one selected from image sensors having different attributes, such as a RGB sensor, a black-and-white (BW) sensor, an IR sensor, or a UV sensor, a plurality of image sensors having the same attribute(s), or a plurality of image sensors having different attributes. Each image sensor included in the image sensor 1630 may be implemented using, for example, a charged coupled device (CCD) sensor or a complementary metal oxide semiconductor (CMOS) sensor.

The image stabilizer 1640 may move the image sensor 1630 or at least one lens included in the lens assembly 1610 in a particular direction, or control an operational attribute (e.g., adjust the read-out timing) of the image sensor 1630 in response to the movement of the camera module 1780 or the electronic device 1701 including the camera module 1780. This allows compensating for at least part of a negative effect (e.g., image blurring) by the movement on an image being captured. According to an embodiment, the image stabilizer 1640 may sense such a movement by the camera module 1780 or the electronic device 1701 using a gyro sensor (not shown) or an acceleration sensor (not shown) disposed inside or outside the camera module 1780. According to an embodiment, the image stabilizer 1640 may be implemented, for example, as an optical image stabilizer. The memory 1650 may store, at least temporarily, at least part of an image obtained via the image sensor 1630 for a subsequent image processing task. For example, if image capturing is delayed due to shutter lag or multiple images are quickly captured, a raw image obtained (e.g., a Bayer-patterned image, a high-resolution image) may be stored in the memory 1650, and its corresponding copy image (e.g., a low-resolution image) may be previewed via the display module 1760. Thereafter, if a specified condition is met (e.g., by a user's input or system command), at least part of the raw image stored in the memory 1650 may be obtained and processed, for example, by the image signal processor 1660. According to an embodiment, the memory 1650 may be configured as at least part of the memory 1730 or as a separate memory that is operated independently from the memory 1730.

The image signal processor 1660 (including, e.g., image signal processing circuitry) may perform one or more image processing with respect to an image obtained via the image sensor 1630 or an image stored in the memory 1650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1660 may perform control (e.g., exposure time control or read-out timing control) with respect to at least one (e.g., the image sensor 1630) of the components included in the camera module 1780. An image processed by the image signal processor 1660 may be stored back in the memory 1650 for further processing, or may be provided to an external component (e.g., the memory 1730, the display module 1760, the electronic device 1702, the electronic device 1704, or the server 1708) outside the camera module 1780. According to an embodiment, the image signal processor 1660 may be configured as at least part of the processor 1720, or as a separate processor that is operated independently from the processor 1720. If the image signal processor 1660 is configured as a separate processor from the processor 1720, at least one image processed by the image signal processor 1660 may be displayed, by the processor 1720, via the display module 1760 as it is or after being further processed.

According to an embodiment, the electronic device 1701 (see FIG. 17) may include a plurality of camera modules 1780 having different attributes or functions. In such a case, at least one of the plurality of camera modules 1780 may form, for example, a wide-angle camera and at least another of the plurality of camera modules 1780 may form a telephoto camera. Similarly, at least one of the plurality of camera modules 1780 may form, for example, a front camera and at least another of the plurality of camera modules 1780 may form a rear camera.

FIG. 17 is a block diagram illustrating an example electronic device 1701 in a network environment 1700 according to various embodiments. Referring to FIG. 17, the electronic device 1701 in the network environment 1700 may communicate with an electronic device 1702 via a first network 1798 (e.g., a short-range wireless communication network), or at least one of an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In various embodiments, at least one of the components (e.g., the connecting terminal 1778) may be omitted from the electronic device 1701, or one or more other components may be added in the electronic device 1701. In various embodiments, some of the components (e.g., the sensor module 1776, the camera module 1780, or the antenna module 1797) may be implemented as a single component (e.g., the display module 1760).

The processor 1720 may execute, for example, software (e.g., a program 1740) to control at least one other component (e.g., a hardware or software component) of the electronic device 1701 coupled with the processor 1720, and may perform various data processing or computation. According to an embodiment, as at least part of the data processing or computation, the processor 1720 may store a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), or an auxiliary processor 1723 (e.g., a graphics processing unit (GPU), a neural processing unit (NPU), an image signal processor (ISP), a sensor hub processor, or a communication processor (CP)) that is operable independently from, or in conjunction with, the main processor 1721. For example, when the electronic device 1701 includes the main processor 1721 and the auxiliary processor 1723, the auxiliary processor 1723 may be adapted to consume less power than the main processor 1721, or to be specific to a specified function. The auxiliary processor 1723 may be implemented as separate from, or as part of, the main processor 1721.

The auxiliary processor 1723 may control at least some of functions or states related to at least one component (e.g., the display module 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723. According to an embodiment, the auxiliary processor 1723 (e.g., the neural processing unit) may include a hardware structure specified for artificial intelligence model processing. An artificial intelligence model may be generated by machine learning. Such learning may be performed, e.g., by the electronic device 1701 where the artificial intelligence is performed or via a separate server (e.g., the server 1708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input module 1750 may receive a command or data to be used by another component (e.g., the processor 1720) of the electronic device 1701, from the outside (e.g., a user) of the electronic device 1701. The input module 1750 may include, for example, a microphone, a mouse, a keyboard, a key (e.g., a button), or a digital pen (e.g., a stylus pen).

The sound output module 1755 may output sound signals to the outside of the electronic device 1701. The sound output module 1755 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 1760 may visually provide information to the outside (e.g., a user) of the electronic device 1701. The display module 1760 may include, for example, a display, a hologram device, or a projector and control circuitry to control a corresponding one of the display, hologram device, and projector. According to an embodiment, the display module 1760 may include a touch sensor adapted to detect a touch, or a pressure sensor adapted to measure the intensity of force incurred by the touch.

The audio module 1770 may convert a sound into an electrical signal and vice versa. According to an embodiment, the audio module 1770 may obtain the sound via the input module 1750, or output the sound via the sound output module 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or a movement) or electrical stimulus which may be recognized by a user via his/her tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to an embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™ wireless-fidelity (Wi-Fi) direct, or infrared data association (IrDA)) or the second network 1799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The wireless communication module 1792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., the mmWave band) to achieve, e.g., a high data transmission rate. The wireless communication module 1792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., the external electronic device) of the electronic device 1701. According to an embodiment, the antenna module 1797 may include an antenna including a radiating element composed of or including a conductive material or a conductive pattern formed in or on a substrate (e.g., a printed circuit board (PCB)). According to an embodiment, the antenna module 1797 may include a plurality of antennas (e.g., array antennas). In such a case, at least one antenna appropriate for a communication scheme used in the communication network, such as the first network 1798 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment, another component (e.g., a radio frequency integrated circuit (RFIC)) other than the radiating element may be additionally formed as part of the antenna module 1797.

According to various embodiments, the antenna module 1797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 or 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example. The electronic device 1701 may provide ultra low-latency services using, e.g., distributed computing or mobile edge computing. In an embodiment, the external electronic device 1704 may include an internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 100 in FIG. 1) according to various example embodiments may include a memory (e.g., the memory 130 in FIG. 1), a display (e.g., the display 110 in FIG. 1), and at least one processor (e.g., the processor 120 in FIG. 1) connected to the memory and the display. The memory may store instructions which, when executed, cause the at least one processor to determine a first image to be corrected, acquire a second image by correcting the first image, identify, from among multiple parts in the second image, at least one point part for recommending an effect due to the correction, and display, through the display, the second image in which an indicator indicating the at least one point part is included.

According to various example embodiments, a screen (e.g., the screen 510 in FIG. 5, or the first screen 610 or the second screen 650 in FIG. 6) displayed through the display may include a first view area displaying a first part of the first image, a second view area displaying a second part of the second image, the indicator in the second view area, and a handler configured to divide the first view area and the second view area. The first part of the first image and the second part of the second image may be displayed on the screen so as to be combined to form one image.

According to various example embodiments, the handler may be displayed at a position outside the at least one point part.

According to various example embodiments, when there are multiple point parts in the second image, a position of the handler may be adjusted based on positions of the multiple point parts.

According to various example embodiments, depending on a user input for moving the handler, the size of the first view area and the size of the second view area may be changed in conjunction with each other.

According to various example embodiments, in response to a user input requesting a correction effect comparison, a second screen (e.g., the second area 950 in FIG. 9) that compares and shows one or more third images, to which each of one or more correction functions applied to the correction has been separately applied, may be displayed through the display.

According to various example embodiments, a third screen (e.g., the second screen 1020 in FIG. 10) may be displayed in response to a user input requesting repeated application of a pre-applied correction function. The screen may include a first view area displaying a first part of the first image, a second view area displaying a second part of the second image to which the correction function has been applied, a third view area displaying a third part of a third image to which the correction function has been repeatedly applied, a first handler configured to divide the first view area and the second view area, and a second handler configured to divide the second view area and the third view area. The first part of the first image, the second part of the second image, and the third part of the third image may be displayed on the screen so as to be combined to form one image.

According to various example embodiments, depending on movement of the handler, the indicator may disappear or a display state of the indicator may be changed.

According to various example embodiments, when the handler moves to pass through the indicator, the display of the indicator may be maintained, and a part appearing to correspond to the indicator may be changed from a part in the second image to a part in the first image by the movement of the handler.

According to various example embodiments, a fourth screen (e.g., the second screen 720 in FIG. 7) may be displayed in response to a user input selecting one point part from among the at least one point part. On the screen, a part of the second image, corresponding to the selected point part, may be enlarged and displayed, and a map guiding a position of the selected point part in the entire area of the second image may be displayed.

According to various example embodiments, a fifth screen (e.g., the third screen 730 or the fourth screen 750 in FIG. 7) may be displayed in response to a user input selecting one point part from among the at least one point part. The screen may include a first view area in which an indicator indicating the selected point part and a cropped part of the second image corresponding to the selected point part are displayed, a second view area in which a first part in the first image corresponding to the selected point part is displayed, a third view area in which a second part in the second image, corresponding to the selected point part, is displayed so as to be compared with the first part in the first image, and a handler disposed between the second view area and the third view area.

According to various example embodiments, when a zoom input is received in one of the second view area and the third view area, the first part and the second part may be synchronously scaled and displayed in both the second view area and the third view area.

According to various example embodiments, the instructions may cause the at least one processor to, additionally, perform the correction by applying a correction function set recommended for the first image, compare corresponding parts to find a difference between the first image and the second image, and identify the at least one point part, based on the comparison result.

According to various example embodiments, an interaction area including multiple correction function buttons may be displayed, and each correction function applied to the second image may be turned on or off according to a user input in the interaction area to update the displayed second image.

According to various example embodiments, the instructions may cause the at least one processor to, additionally, analyze the first image using a learning model trained using an artificial intelligence algorithm, and, when a correction function set to be recommended for the first image are determined as a result of the analysis, perform the correction for the first image by applying the correction function set.

An image processing method of an electronic device according to various example embodiments may include determining a first image to be corrected, acquiring a second image through a correction of the first image, identifying, from among multiple parts in the second image, at least one point part for recommending an effect due to the correction, and displaying a screen in which an indicator indicating the at least one point part is included in the second image.

According to various example embodiments, the screen may include a first view area displaying a first part of the first image, a second view area displaying a second part of the second image, an indicator in the second view area, and a handler configured to divide the first view area and the second view area. The first part of the first image and the second part of the second image may be displayed on the screen so as to be combined to form one image.

The image processing method of the electronic device according to various example embodiments may further include displaying, in response to a user input requesting a correction effect comparison, a second screen that compares and shows one or more third images to which each of one or more correction functions applied to the correction has been separately applied.

The image processing method of the electronic device according to various example embodiments may further include displaying a third screen in response to a user input requesting repeated application of a pre-applied correction function. The third screen may include a first view area displaying a first part of the first image, a second view area displaying a second part of the second image to which the correction function has been applied, a third view area displaying a third part of a third image to which the correction function has been repeatedly applied, a first handler configured to divide the first view area and the second view area, and a second handler configured to divide the second view area and the third view area. The first part of the first image, the second part of the second image, and the third part of the third image may be displayed so as to be combined to form one image.

According to various example embodiments, in response to a user input selecting one point part from among the at least one point part, a part of the second image, corresponding to the selected point part, may be enlarged and displayed, and a map guiding a position of the selected point part in the entire area of the second image may be displayed.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display;
   at least one processor comprising processing circuitry; and
   memory storing instructions which, when executed by the at least one processor, cause the electronic device to:
   determine a first image of an original version to be corrected;
   acquire a second image of a corrected version by correcting the first image;
   identify, from the second image, a plurality of corrected parts for recommending an effect due to the correction; and
   display, through the display, a first screen including an image that combines a first partial image from the first image of the original version and a second partial image from the second image of the corrected version,
   wherein the first screen comprises:
   a first view area displaying the first partial image;
   a second view area displaying the second partial image;
   a handler configured to divide the first view area and the second view area to enable the first image of the original version and the second image of the corrected version to be compared with each other; and
   an indicator indicating at least one of the plurality of corrected parts in the second partial image of the second view area.

2. The electronic device of claim 1, wherein the instructions, when executed by the at least one processor, cause the electronic device to:
   in response to a user input for moving the handler to a first direction, display a second screen through the display, wherein, in the second screen, a size of the second view area increases, the indicator represents or a number of indicators increases; and
   in response to a user input for moving the handler to a second direction, display a third screen through the display, wherein, in the third screen, the size of the second view area decreases, the indicator disappears or the number of indicators decreases.

3. The electronic device of claim 1, wherein the handler is displayed at a position outside the plurality of corrected parts.

4. The electronic device of claim 1, wherein a position of the handler is adjusted based on positions of the plurality of corrected parts for recommending an effect.

5. The electronic device of claim 1, wherein, depending on a user input for moving the handler in a first direction or a user input for moving the handler in a second direction, a size of the first view area and a size of the second view area are changed in conjunction with each other.

6. The electronic device of claim 1, wherein, in response to a user input requesting a correction effect comparison, a screen that compares and shows one or more third images to which each of one or more correction functions applied to the correction has been separately applied is displayed through the display.

7. The electronic device of claim 1, wherein a screen is displayed in response to a user input requesting repeated application of a pre-applied correction function, the screen comprising:
   a first view area displaying a first partial image of the first image;
   a second view area displaying a second partial image of the second image to which the correction function has been applied;
   a third view area displaying a third partial image of a third image to which the correction function has been repeatedly applied;
   a first handler configured to divide the first view area and the second view area; and
   a second handler configured to divide the second view area and the third view area, and
   wherein the first partial image of the first image, the second partial image of the second image, and the third partial image of the third image are displayed on the screen so as to be combined to form one image.

8. The electronic device of claim 1, wherein, based on movement of the handler, the indicator disappears or a display state of the indicator is changed.

9. The electronic device of claim 1, wherein, based on the handler moving to pass through the indicator, the display of the indicator is maintained, and a part appearing to correspond to the indicator is changed from a partial image of the second image to a partial image of the first image by the movement of the handler.

10. The electronic device of claim 1, wherein, in response to a user input selecting one part for recommending an effect from among the plurality of corrected parts for recommending an effect, a partial image of the second image, corresponding to the selected part, is enlarged and displayed, and a map guiding a position of the selected part in the entire area of the second image is displayed.

11. The electronic device of claim 1, wherein a screen is displayed in response to a user input selecting one part for recommending an effect from among the plurality of corrected parts, the screen comprising:
   a first view area in which an indicator indicating the selected part and a cropped partial image of the second image corresponding to the selected part are displayed;

a second view area in which a first partial image of the first image, corresponding to the selected part, is displayed;
a third view area in which a second partial image of the second image, corresponding to the selected part, is displayed so as to be compared with the first partial image of the first image; and
a handler disposed between the second view area and the third view area.

12. The electronic device of claim 11, wherein, when a zoom input is received in one of the second view area and the third view area, the first partial image and the second partial image are synchronously scaled and displayed in both the second view area and the third view area.

13. The electronic device of claim 1, wherein the instructions cause the at least one processor to, additionally:
perform the correction by applying a correction function set recommended for the first image;
compare corresponding parts to find a difference between the first image and the second image; and
identify the plurality of corrected parts, based on the comparison result.

14. The electronic device of claim 1, wherein an interaction area comprising multiple correction function buttons is displayed, and each correction function applied to the second image is turned on or off according to a user input in the interaction area to update the displayed second image.

15. The electronic device of claim 1, wherein the instructions, when executed by the at least one processor, cause the electronic device to:
analyze the first image by using a learning model trained using an artificial intelligence algorithm, and
when a correction function set to be recommended for the first image are determined as a result of the analysis, perform the correction for the first image by applying the correction function set.

16. An image processing method of an electronic device, the method comprising:
determining a first image of an original version to be corrected;
acquiring a second image of a corrected version through a correction of the first image;
identifying, from the second image, a plurality of corrected parts for recommending an effect due to the correction; and
displaying a first screen including an image that combines a first partial image from the first image of the original version and a second partial image from the second image of the corrected version,
wherein the first screen comprises:
a first view area displaying the first partial image;
a second view area displaying the second partial image;
a handler configured to divide the first view area and the second view area to enable the first image of the original version and the second image of the corrected version to be compared with each other, configured to divide the first view area and the second view area; and
an indicator indicating at least one of the plurality of corrected parts in the second partial image of the second view area.

17. The method of claim 16, further comprising:
in response to a user input for moving the handler to a first direction, displaying a second screen through the display, wherein, in the second screen, a size of the second view area increases, the indicator represents or a number of indicators increases; and
in response to a user input for moving the handler to a second direction, displaying a third screen through the display, wherein, in the third screen, the size of the second view area decreases, the indicator disappears or the number of indicators decreases.

18. The method of claim 16, further comprising displaying, in response to a user input requesting a correction effect comparison, a screen that compares and shows one or more third images to which each of one or more correction functions applied to the correction has been separately applied.

19. The method of claim 16, further comprising displaying a screen in response to a user input requesting repeated application of a pre-applied correction function,
wherein the screen includes:
a first view area displaying a first partial image of the first image,
a second view area displaying a second partial image of the second image to which the correction function has been applied,
a third view area displaying a third partial image of a third image to which the correction function has been repeatedly applied,
a first handler configured to divide the first view area and the second view area, and
a second handler configured to divide the second view area and the third view area,
wherein the first partial image of the first image, the second partial image of the second image, and the third partial image of the third image is displayed so as to be combined to form one image.

20. The method of claim 16, wherein, in response to a user input selecting one part from among the plurality of corrected parts:
a partial image of the second image, corresponding to the selected part, is enlarged and displayed, and
a map guiding a position of the selected part in the entire area of the second image is displayed.

* * * * *